United States Patent [19]
Johnson

[11] Patent Number: 6,065,070
[45] Date of Patent: May 16, 2000

[54] DMA CONFIGURABLE CHANNEL WITH MEMORY WIDTH N AND WITH STEERING LOGIC COMPRISING N MULTIPLEXORS, EACH MULTIPLEXOR HAVING A SINGLE ONE-BYTE INPUT AND N ONE-BYTE OUTPUTS

[75] Inventor: Mark A. Johnson, Austin, Tex.

[73] Assignee: National Semiconductor Corporation, Santa Clara, Calif.

[21] Appl. No.: 09/040,588

[22] Filed: Mar. 18, 1998

Related U.S. Application Data

[60] Provisional application No. 60/041,329, Mar. 20, 1997.

[51] Int. Cl.[7] .......................... G06F 13/00; G06F 12/00; G06F 13/40; G06F 13/38

[52] U.S. Cl. ............................ 710/22; 710/66; 710/126; 710/127; 710/129; 710/130; 710/131; 709/212; 709/231; 709/232; 711/201; 364/239.1; 364/239.3; 364/240.3; 364/242.3; 364/242.31; 364/260; 364/260.1

[58] Field of Search ................................ 710/22, 24, 131, 710/66, 25, 129, 126, 127, 130; 709/212, 231, 232, 238, 246; 711/201; 364/238.6, 239.1, 239.3, 240.3, 242.3, 242.31, 260, 260.1; 395/842, 844, 845, 886, 306, 307, 309, 310, 311, 200.42, 200.61, 200.62, 200.66, 200.76

[56] References Cited

U.S. PATENT DOCUMENTS

| | | | |
|---|---|---|---|
| 4,977,582 | 12/1990 | Nicols et al. | 375/118 |
| 5,170,477 | 12/1992 | Potter et al. | 395/425 |
| 5,251,303 | 10/1993 | Fogg, Jr. et al. | 710/24 |
| 5,392,406 | 2/1995 | Petersen et al. | 710/131 |
| 5,434,872 | 7/1995 | Petersen et al. | 714/811 |
| 5,440,691 | 8/1995 | Carrafiello et al. | 709/234 |
| 5,446,845 | 8/1995 | Arrayo et al. | 395/250 |
| 5,517,627 | 5/1996 | Petersen | 395/311 |
| 5,542,053 | 7/1996 | Bland et al. | 710/129 |
| 5,548,786 | 8/1996 | Amini et al. | 395/842 |
| 5,594,927 | 1/1997 | Lee et al. | 710/66 |
| 5,687,328 | 11/1997 | Lee | 395/306 |

(List continued on next page.)

*Primary Examiner*—Thomas C. Lee
*Assistant Examiner*—Tanh Quang Nguyen
*Attorney, Agent, or Firm*—Limbach & Limbach L.L.P.

[57] ABSTRACT

A descriptor controlled transmit and receive scatter/gather Direct Memory Access Controller efficiently moves data frames comprised of scattered blocks of data from within memory to a destination interface via a multibyte-wide buffer. The transfer of frames into a transmit buffer and out of a receive buffer is optimized regardless of the total length of the component data blocks and regardless of whether the data blocks include an odd or even number of bytes, whether the data blocks begin at an odd or even address, or whether the data blocks are misaligned with regard to memory width boundaries. A DMAC in accordance with an embodiment of the present invention stores information provided by a descriptor before frame processing takes place. This information in conjunction with steering logic and accumulator registers is used to control the steering and storing of the frame data as it passes through the DMAC to the transmit buffer or from the receive buffer. An alternate embodiment of the present invention performs these functions based on the present values of the descriptor fields. Using predetermined data block descriptor information, the present invention is able to determine on the fly the most efficient way to arrange the bytes of data within the data buffers or memory and concatenate the component data buffers in a buffer or memory to assemble the frames, while inserting frame delineating control words to circumvent the necessity for logic to keep track of these boundaries. The use of the descriptor to steer the data into the transmit buffer or out of the receive buffer allows a simplified hardware implementation as compared to prior art methods that must examine and count the data as it is transferred.

11 Claims, 19 Drawing Sheets

Microfiche Appendix Included
(1 Microfiche, 35 Pages)

U.S. PATENT DOCUMENTS

| | | | |
|---|---|---|---|
| 5,708,849 | 1/1998 | Coke et al. | 710/22 |
| 5,727,173 | 3/1998 | Rupp | 395/311 |
| 5,740,448 | 4/1998 | Gentry et al. | 395/726 |
| 5,822,568 | 10/1998 | Swanstrom | 395/500 |
| 5,826,106 | 10/1998 | Pang | 710/25 |
| 5,872,959 | 2/1999 | Nguyen et al. | 395/552 |
| 5,943,504 | 8/1999 | Flurry et al. | 710/22 |
| 6,003,122 | 12/1999 | Yarch et al. | 710/201 |

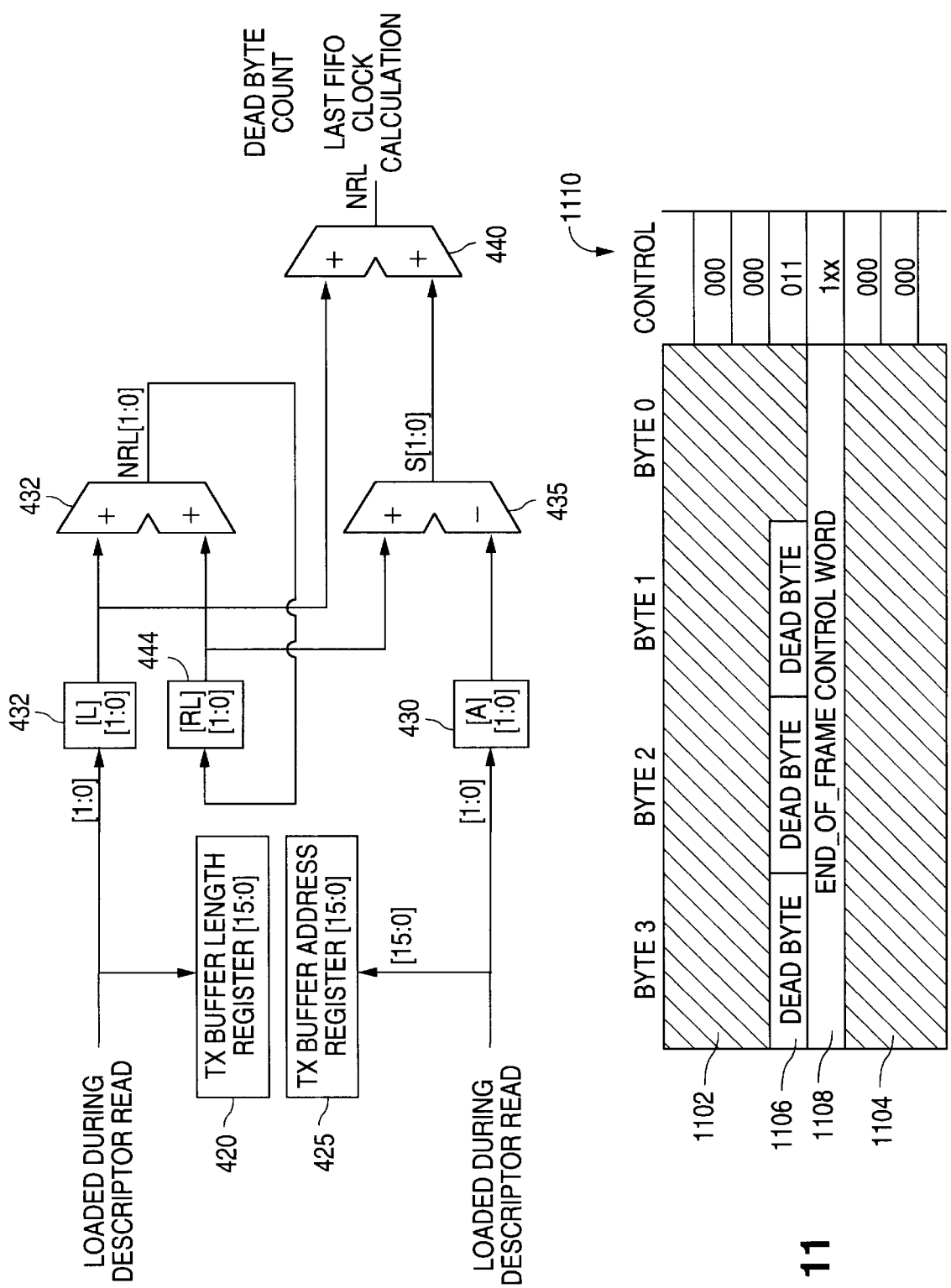

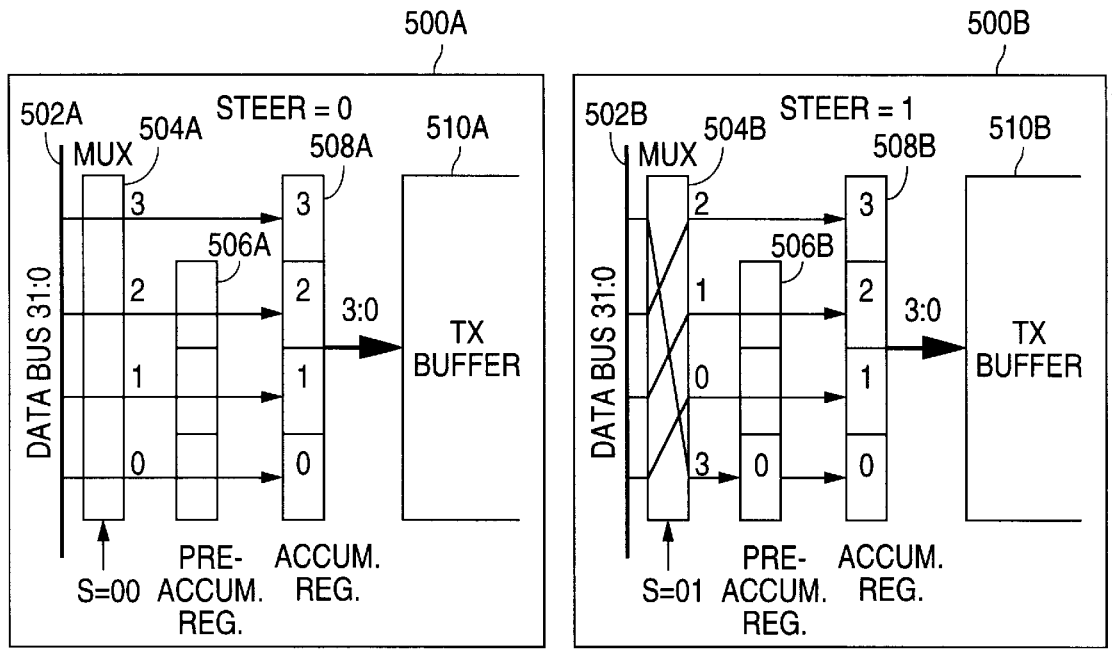
FIG. 5A  FIG. 5B
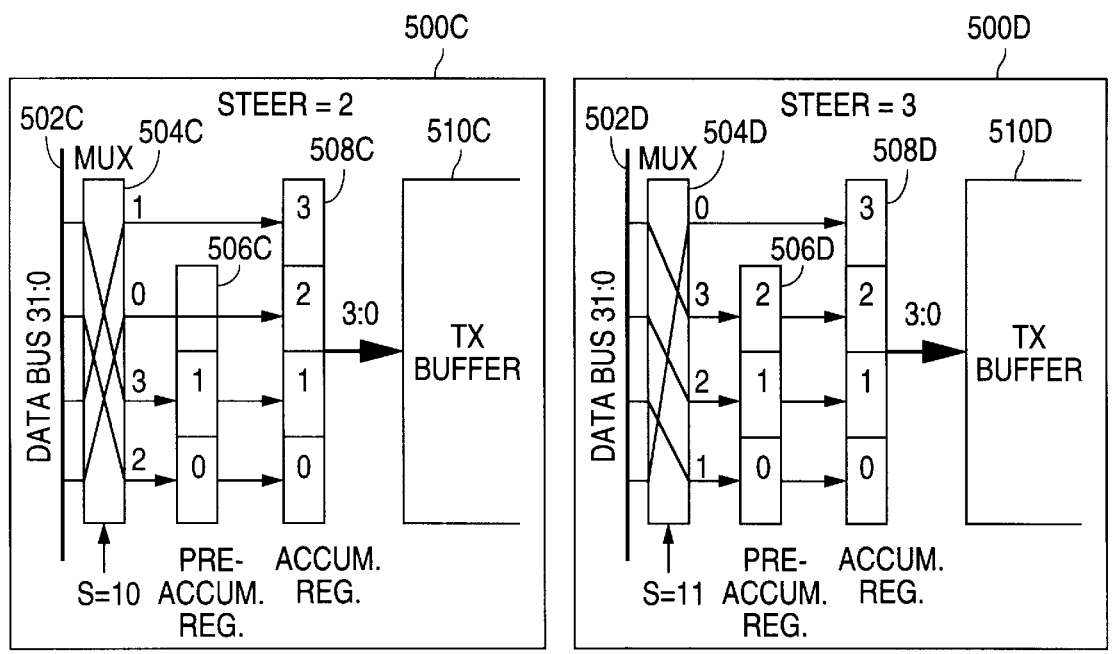
FIG. 5C  FIG. 5D

FIG. 6

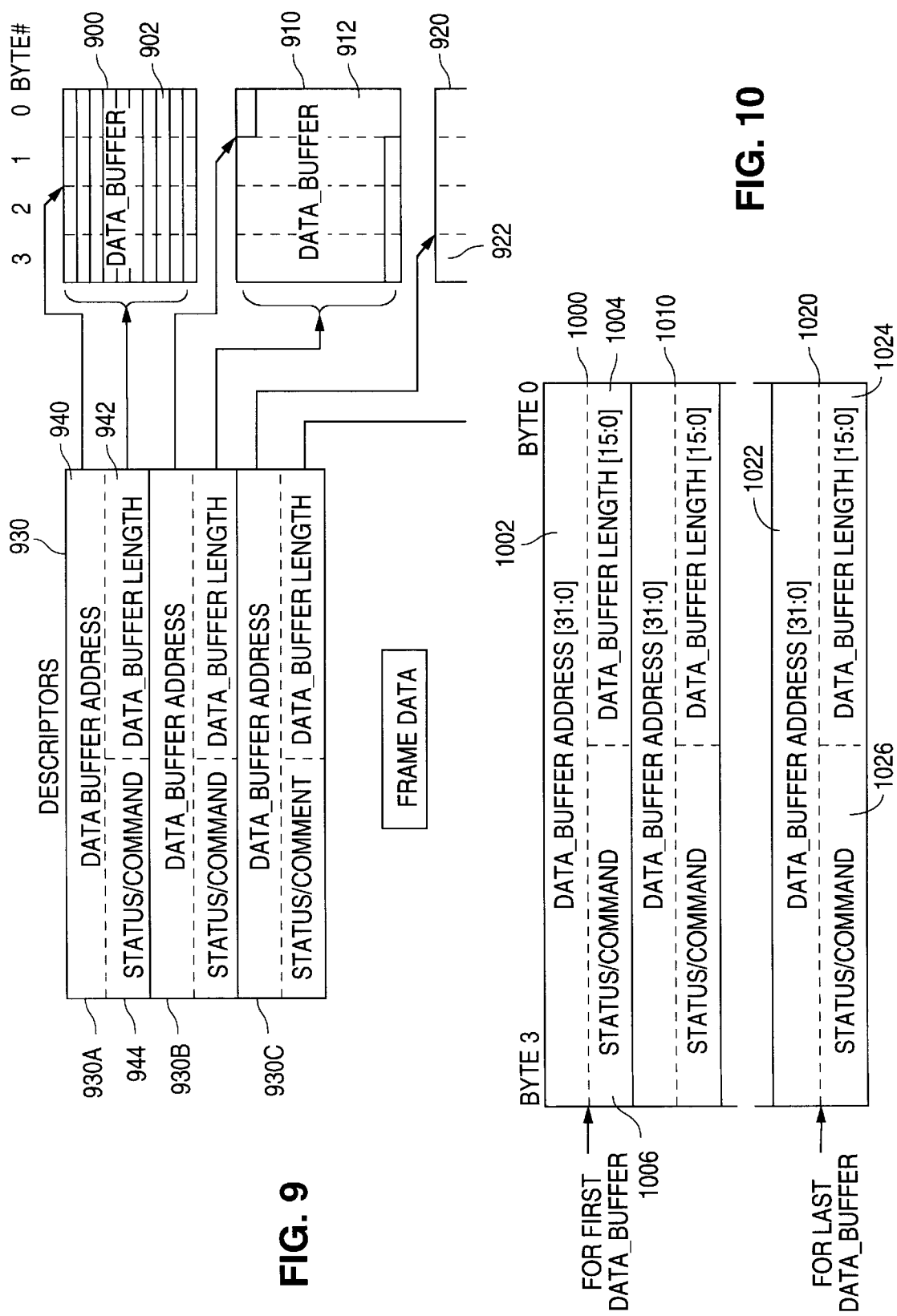

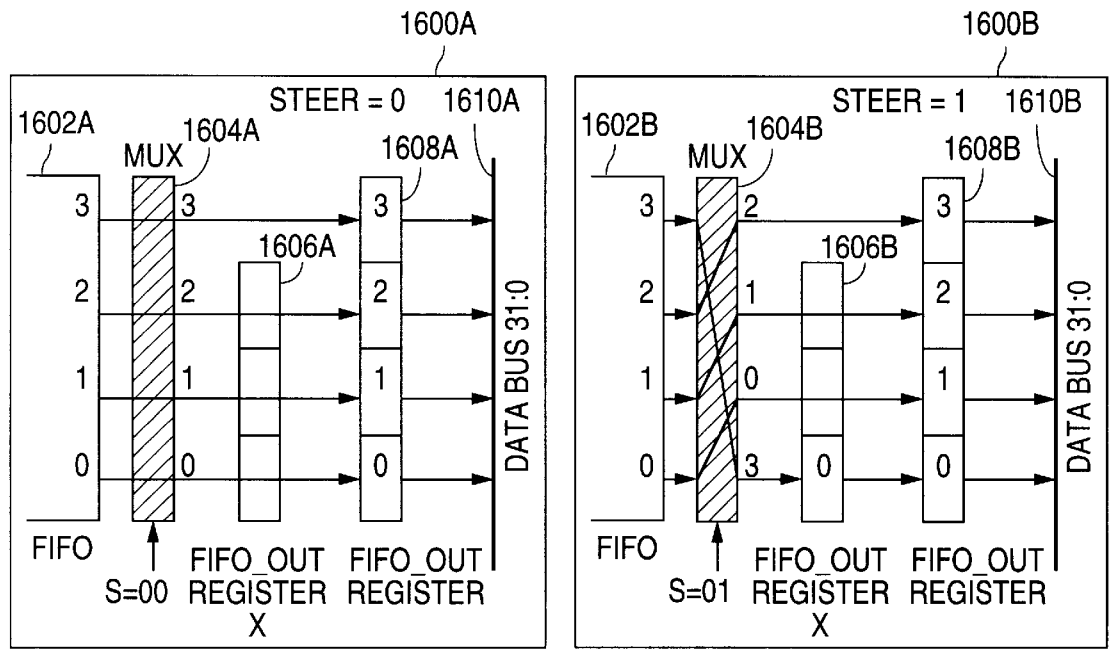
FIG. 16A          FIG. 16B
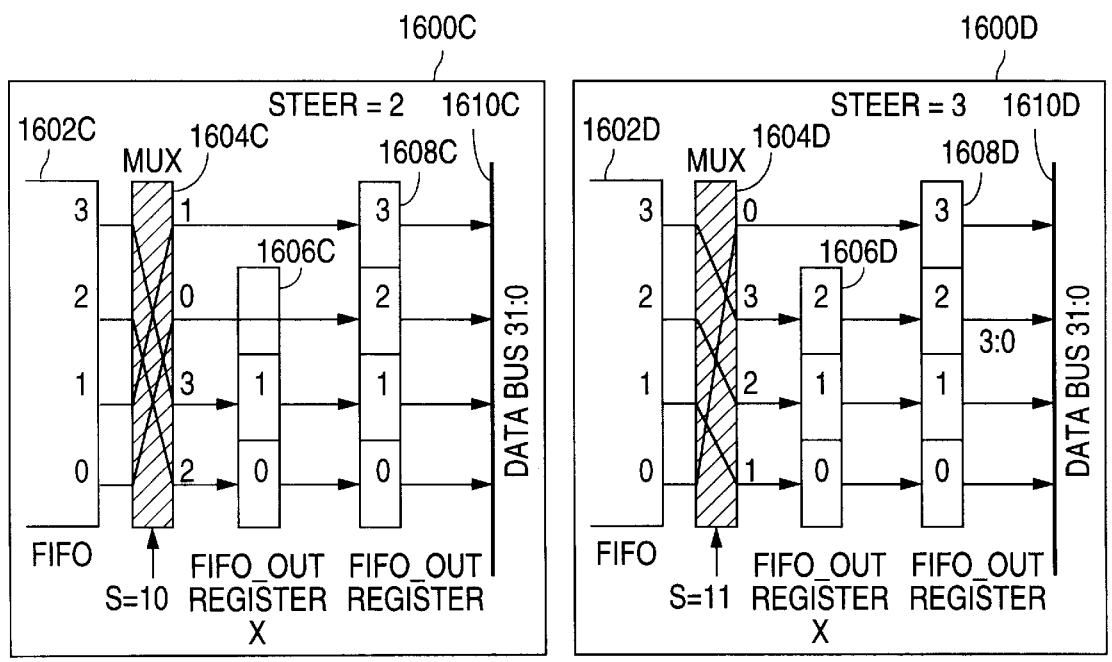
FIG. 16C          FIG. 16D

FIFO_OUT_REGISTER_INITIAL_CLOCK ENABLE

| $S_{1:0}$ (STEER) | $[A]_{1:0}$ (LATCHED ADDRESS) | | | |
|---|---|---|---|---|
| | 0 | 1 | 2 | 3 |
| 0 | [PS] = 0 | | | |
| 1 | ✓ | [PS] = 0 | | |
| 2 | ✓ | ✓ | [PS] = 0 | |
| 3 | ✓ | ✓ | ✓ | [PS] = 0 |

FIFO_OUT_REGISTER_RUNNING_CLOCK INHIBIT

| $S_{1:0}$ (STEER) | $[A]_{1:0} + [L]_{1:0}$ (LATCHED ADDRESS + LATCHED LENGTH) | | | |
|---|---|---|---|---|
| | 0 | 1 | 2 | 3 |
| 0 | | | | |
| 1 | | | | |
| 2 | | ✓ | | |
| 3 | | ✓ | ✓ | |

DMA CONFIGURABLE CHANNEL WITH MEMORY WIDTH N AND WITH STEERING LOGIC COMPRISING N MULTIPLEXORS, EACH MULTIPLEXOR HAVING A SINGLE ONE-BYTE INPUT AND N ONE-BYTE OUTPUTS

RELATED DOCUMENTS

This application claims priority from Provisional Application Number 60/041,329 filed Mar. 20, 1997 and entitled TRANSMIT AND RECEIVE CHANNEL SCATTER/GATHER CONTROL METHOD AND APPARATUS.

This application includes two appendices.

Microfiche Appendix A includes a computer listing in hardware definition language code of a specific embodiment of the present invention.

Appendix B includes a document written by the inventor that contains notes regarding a specific implementation of the present invention.

The appendices contain copyrighted material, consisting of one (1) microfiche with thirty-five (35) frames and one document containing seventeen (17) pages. The copyright owner has no objection to the facsimile reproduction by anyone of the patent document or the patent disclosure, as it appears in the Patent and Trademark Office patent file or records, but otherwise reserves all copyright rights whatsoever in the appendices.

BACKGROUND OF THE INVENTION

1. Field of the Invention

The present invention relates to the high speed transfer of information within a data processing system and in particular, it relates to Direct Memory Access (DMA) transfers. More specifically the present invention relates to optimizing DMA transfers between a memory system and a First-In, First-Out (FIFO) Random Access Memory (RAM) buffer.

2. Description of the Related Art

Program controlled data transfers within a data processing system such as a computer require a significant amount of the central processor's time to transfer a relatively small amount of data per unit time, i.e., a low data rate. In addition, the central processor cannot execute any other processing functions during program controlled Input/Output (I/O) operations. Although interrupts increase the attainable data rate, require less software, and allow concurrent processing, applications exist where the required data rate is simply too high to be achieved by using interrupts or where the data rate is such that the time spent in interrupt service routines impacts the concurrent processing to an unacceptable degree.

However, Direct Memory Access (DMA) facilitates maximum I/O data rates and maximum concurrency. Unlike the programmed I/O and interrupt I/O transfer methods that route data through the processor, a system that supports a DMA transfer method directly transfers data between memory and an I/O device. To implement a DMA transfer method, additional logic external to the central processor, called a DMA Controller (DMAC), is required.

DMACs, typically embodied as specialized dedicated I/O processors, include counters to provide the memory and port addresses and to count the number of words transferred. Before a transfer can occur, the central processor must initialize the DMAC to specify the direction and type of transfer, the source and destination addresses, and the number of bytes or words to be transferred. Once this initialization is completed, the central processor releases the system buses, the DMAC takes control of the buses, and the DMAC performs the entire transfer.

Unlike a data transfer performed by the central processor, no instructions need to be fetched during the transfer to tell the DMAC how to perform the transfer. Thus, all memory cycles are available for transferring data, and the transfer can be performed at the maximum speed possible, i.e. the memory access speed. The peripheral device or I/O system that is either the destination or source of the transferred data generally operates at a slower rate than this maximum. Thus, the DMAC can allow the central processor to run for a few cycles in between transfers while the DMAC waits for the device or I/O system to be ready to transfer the next byte.

After the DMAC has been initialized by the microprocessor, the peripheral (such as a LAN interface or disk controller) can initiate the transfer at any time by asserting the DMA REQUEST input to the DMAC. The DMAC then asserts BUS REQUEST to the central processor (this signal is called HOLD in some systems). The central processor completes the instruction it is currently executing, disables its address, data, and control bus outputs, and asserts the BUS ACKNOWLEDGE signal. The DMAC then takes control of the buses to perform the transfer. The DMAC controls the buses in the same manner as the microprocessor.

Upon taking control of the buses, the DMAC is said to establish a channel between memory and the target or source device. A transmit channel allows the DMAC to transfer of data out of memory while a receive channel allows the transfer of data into memory. DMACs can be designed to support multiple pairs of transmit and receive channels so as to support multiple devices. In addition, channels can be bi-directional. Prior art DMACs are further disclosed in M. Slater, *Microprocessor-Based Design*, Mayfair Publishing Co., (1987) and K. L. Short, *Microprocessors and Programmed Logic*, Prentice-Hall, Inc. ($2^{nd}$ ed. 1990), which are both incorporated herein by reference.

Typically, a transmit channel requires the use of a RAM buffer to temporarily store a unit of data, called a frame, as it is transferred from memory to an interface having a bus width different than memory. Likewise, receive channels also employ a buffer when transferring data from an interface to memory. This buffer is usually required due to bus latency, characteristic of any multi-user bus.

Most digital communication protocols run on LAN or WAN adapters require data to be arranged in data frames, or data packets, having a characteristic maximum size. Although data frames are usually defined as having a maximum length, hardware systems that support different protocols must be able to handle frames of any length. However, to optimize the use of memory, most computer operating systems typically allocate blocks of memory for temporary data storage in sizes smaller than the size of typical data frames. Thus, a single data frame will usually be comprised of data contained in several different blocks of memory. The blocks of memory each contain a data buffer and can be scattered non-sequentially throughout memory. Memory typically has a width that is equal to an even number of bytes and the bytes define addressable boundaries across the width of the memory.

Usually, the system will maintain a list of the data buffers that comprise a data frame. The data buffers themselves are defined by descriptors. Descriptors are small tables stored in memory, each associated with a particular data buffer, that define the size, location and status of the data buffers. As indicated above, a single data frame may be comprised of several data buffers scattered through out memory, it may be of any number of bytes in length, and it may start on any address boundary. In addition, data buffers may be of any number of bytes in length and may start and end on any byte boundary within memory.

FIG. 9 depicts a typical descriptor's 930A relationship to its associated data buffer 902 and the relative position a data buffer 902 may occupy within a block of memory 900. The total shaded region of FIG. 9 represents the bytes that comprise a data frame. Each shaded region within the memory blocks 900, 910, 920 represents a data buffer 902, 912, 922. As depicted, the data frame is comprised of three data buffers 902, 912, 922 and the data buffers 902, 912, 922 do not begin on memory width boundaries.

The list of descriptors 930 together identify the data frames to the system. Each descriptor 930A, 930B, 930C contains information about its corresponding data buffer 902, 912, 922. Referring to both FIGS. 9 and 10, the descriptors 1000, 1010, 1020 hold the address pointer 1002 and length 1004 of the data buffer 902, along with a status and command field 1006. This information can be read from memory and stored in registers within a DMA controller as each data buffer 902 is processed. Because there may be more than one data buffer 902 per data frame as described above, the system will typically maintain an End of Frame status bit within the status and command field 1026 of the descriptor 1020 to indicate that a particular data buffer is the last data buffer in a given frame.

Different computer systems will typically have memory subsystems with different widths. Four bytes wide is currently a popular dimension for a memory but it is anticipated that future systems will be much wider. The width of a memory system defines natural boundaries in the addressing system used to access the memory. A data bus coupled to a memory that is four bytes wide will have thirty-two signal paths, each able to carry one bit of data. The system can access a memory location and, in one cycle, read or write all of the bytes within the memory width boundaries of the accessed location.

Thus, if a four byte wide system is required to provide four bytes of data starting at a memory location aligned on a memory width boundary, the processor will be able to read all four bytes in just one cycle. If however, the desired four bytes of data does not begin at a byte location that is also a memory width boundary, the system will require two cycles; to access the data.

This concept can be more easily visualized with reference to FIG. 9. A four byte wide memory system is depicted indicated by memory blocks 900, 910, and 920. Each block 900, 910, 920 represents a portion of memory space within the four byte wide memory system. The columns drawn with dashed lines on the blocks 900, 910, 920 represent the byte boundaries within the memory system. Each column is labeled with a byte number zero through three from right to left. The solid horizontal lines, shown in block 900, in conjunction with the vertical dashed lines define the individual byte storage locations of the memory system.

The four bytes of any one row of a memory block 900 can be read simultaneously in one cycle. Thus, if four consecutive byte must be accessed and the first byte is located in the column labeled byte zero, the system will only require one cycle to read or write this byte. If, on the other hand, the four bytes that must be accessed start with byte one, two, or three, the system will have to first access the bytes on the row of the starting byte and then, in a second memory access cycle, access the bytes on the next row. If the data had been aligned within memory as above, this four byte access would have taken only half the time.

Thus, when data is aligned with regard to memory width boundaries, it can be accessed faster. What is needed is a method of storing data in memory, transmit buffers, and receive buffers, that quickly and efficiently aligns the data along memory width boundaries as the data is transferred and thus, allows optimized accesses of the data. What is further needed is a system that ascertains the data buffer's characteristics via the descriptors in terms of variables, that do not change state during the data buffer transfer process. This would allow for faster circuitry, thus facilitating the silicon synthesis process.

Prior art DMA systems necessitate the use of wait states during the transfer while the frame is properly assembled for transfer into in the destination memory. Other prior art systems require the use of complex feedback circuitry to realign the bytes during transfers. What is needed is a simple, efficient system that does not require wait states or complex feedback circuitry to align data as it is transferred.

SUMMARY OF THE INVENTION

In accordance with the present invention, a descriptor controlled transmit and receive scatter/gather Direct Memory Access Controller (DMAC) efficiently moves data frames comprised of scattered blocks of data from within memory to a destination interface via a multibyte-wide "First-In, First-Out" (FIFO) Random Access Memory (RAM) buffer. The present invention optimizes the transfer of frames into transmit buffer RAM and out of receive buffer RAM regardless of the total length of the component data blocks and regardless of whether the data blocks include an odd or even number of bytes, whether the data blocks begin at an odd or even address, or whether the data blocks are misaligned with regard to memory width boundaries.

An apparatus with a DMAC in accordance with an embodiment of the present invention stores information provided by a descriptor before frame processing takes place. This information in conjunction with steering logic and accumulator registers is used to control the steering and storing of the frame data as it passes through the DMAC to the transmit buffer or from the receive buffer. An alternate embodiment of the present invention performs these functions based on the present values of the descriptor fields.

Using predetermined data block descriptor information, the present invention is able to determine on the fly the most efficient way to arrange the bytes of data within the data buffers or memory and concatenate the component data buffers in a buffer or memory to assemble the frames. Thus, the present invention avoids a number of inherent inefficiencies of prior art methods. Most notably, the use of the descriptor to steer the data into the transmit buffer or out of the receive buffer allows a simplified hardware implementation as compared to prior art methods that must examine and count the data as it is transferred.

The present invention reduces the complexity of implementing the necessary logical operations as a hardware circuit as compared to prior art methods. These and other features and advantages of the present invention will be understood upon consideration of the following detailed description of the invention and the accompanying drawings.

BRIEF DESCRIPTION OF THE DRAWINGS

FIG. 4 is a block diagram depicting a circuit for configuring the transmit channel according to an example embodiment of the present invention.

FIG. 5 is a diagram depicting the possible transmit channel steering configurations for an example four byte wide system according to an example embodiment of the present invention.

FIG. 6 is a table depicting an example clocking calculation according to an example embodiment of the present invention.

FIG. 9 is a diagram depicting transmit descriptors and associated data buffers according to an example embodiment of the present invention.

FIG. 10 is a diagram depicting the detail of transmit descriptors describing a frame according to an example embodiment of the present invention.

FIG. 11 is a diagram depicting a transmit buffer format example according to an example embodiment of the present invention.

FIG. 16 is a diagram depicting the possible receive channel steering configurations for an example four byte wide system according to an example embodiment of the present invention.

DETAILED DESCRIPTION OF THE INVENTION

The present invention involves a process for moving data with maximum efficiency out of memory into a transmit buffer or into memory from a receive buffer. A process for moving data via a transmit channel into a transmit buffer is described first and then a process for moving data from a receive buffer via a receive channel is disclosed.

Figure 1:
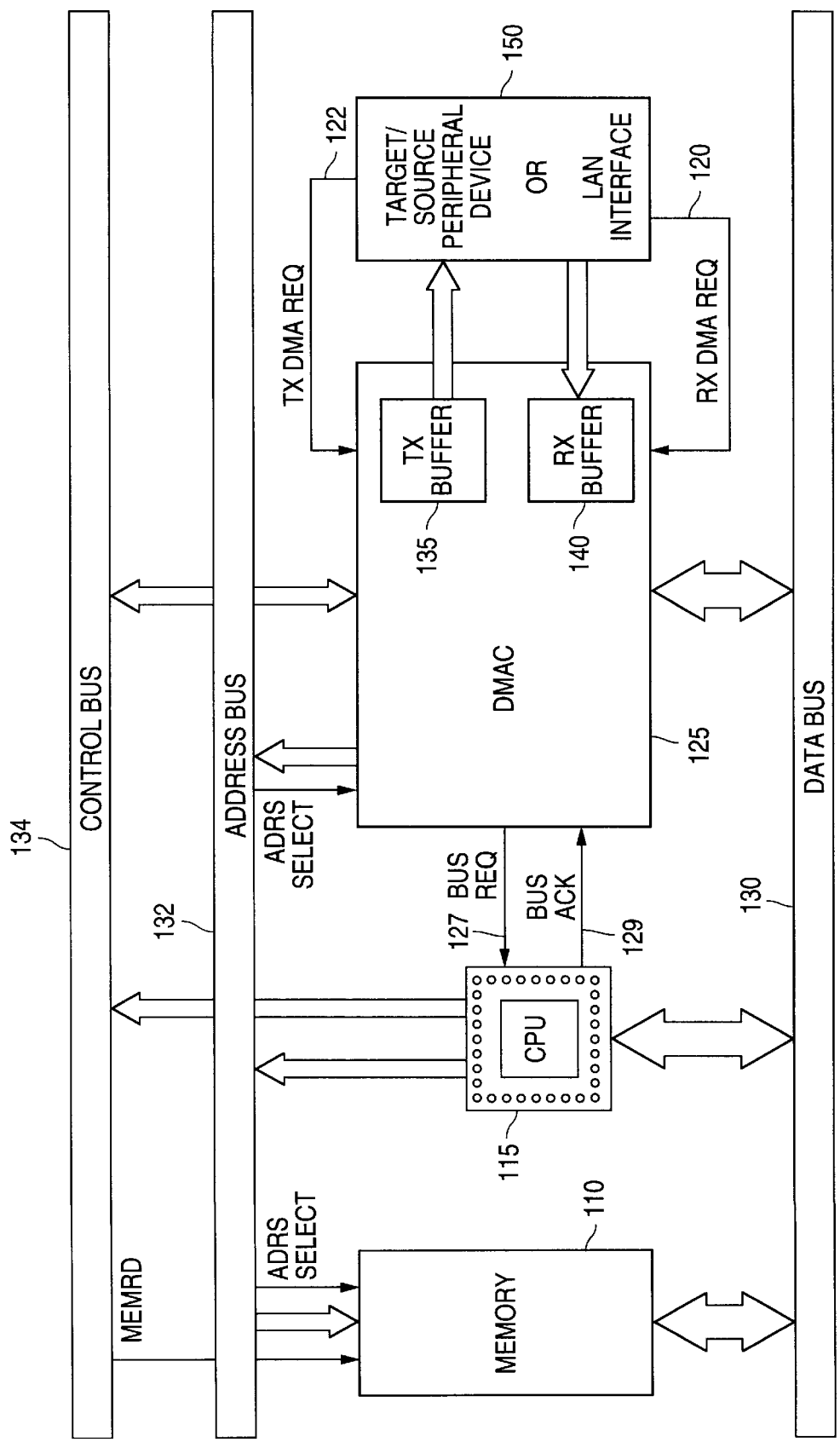
FIG. 1 is a block diagram depicting a data processing system including a direct memory access controller (DMAC) according to an example embodiment of the present invention.

Referring to FIG. 1, data bound for a local area network or other data processing device 150 is typically arranged in data frames comprised of a plurality of data buffers as discussed above with reference to FIGS. 9 and 10. The process of transmitting a data frame includes a device driver running on a processor 115 that assembles the frame in memory 110. Next, the driver software will set up descriptors with all the necessary information to describe the data buffers. At this point, the frame is ready to be transmitted.

Upon receiving a DMA request signal 122 from the target device 150, the DMAC 125 will request control of the buses 130, 132, 134 from the processor 115 via a bus request signal 127. The processor 115 will relinquish control of the buses 130, 132, 134 and signal the DMAC 125 indicating as such via the bus acknowledge signal 129. Then, the DMAC 125 will set up a transmit channel from memory 110, over the data bus 130, through the DMAC 125, into the transmit buffer 135 and out to the target device 150.

As will be described in more detail below, the DMAC 125 can also operate in a receive mode where data flows from a source device 150 through a receive channel created by the DMAC 125 to the memory 110 of the system. When the DMAC 125 is operating in a receive mode, the data from the source device 150 flows through the receive buffer 140, out the DMAC 125, and into memory 110.

Figure 2:
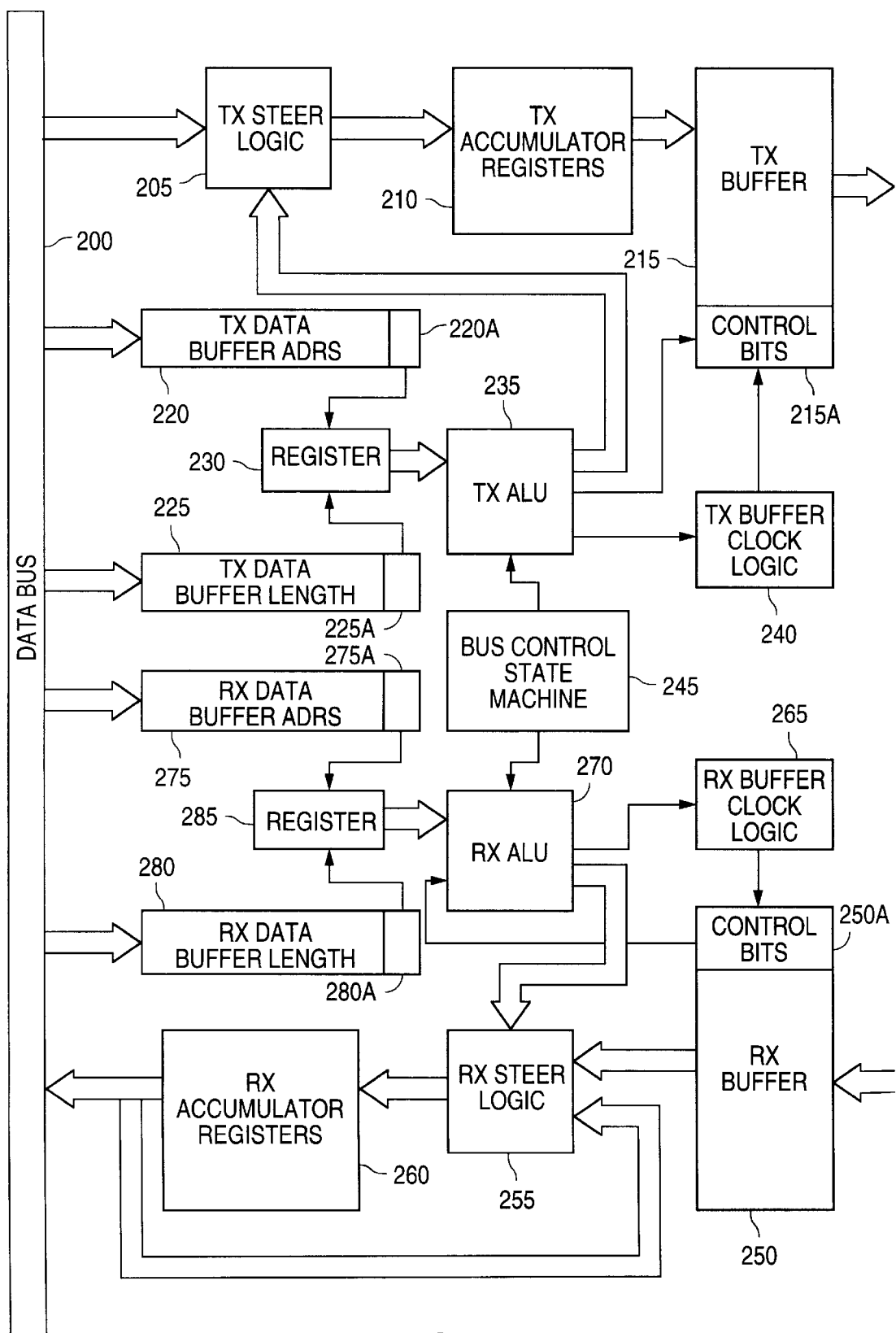
FIG. 2 is a block diagram depicting a DMAC according to an example embodiment of the present invention.

Referring to the upper half of FIG. 2, a more detailed diagram of the DMAC 125 of FIG. 1 is depicted. The transmit channel within the DMAC 125 is comprised of the transmit steer logic 205 connected to the data bus 200, and the transmit accumulation registers 210 connected between the transmit steer logic 205 and the transmit buffer 215. The transmit buffer 215 is typically implemented as a first-in, first-out random access memory. The transmit steer logic 205 and the transmit accumulation registers 210 are used to quickly and efficiently align the data on memory width boundaries as it passes through the transmit channel.

Also connected to the data bus 200 are the transmit data buffer address register 220 and the transmit data buffer length register 225. These registers 220, 225 store the memory address and length from the descriptors of the data buffer currently being transferred and feed them into the logic 230, 235, 240, 245 that calculates the information needed by the steer logic 205 to align the data buffer and also generate the clocking signals that trigger the transfer of bytes of the data buffer into the transmit buffer 215 and out of the transmit buffer 215 to the target device 150 of FIG. 1. In particular, the least significant bits 220A and 225A of the transmit data buffer address register 220 and the transmit data buffer length register 225 respectively are stored in register 230 where they are accessible by the transmit logic 235 which is driven by the bus control state machine 245. The transmit logic 235 feeds control signals to the steer logic 205 as described above and it also controls the transmit buffer 215 by sending signals to the transmit buffer clock logic 240 and the transmit buffer control bits 215A.

Figure 3:
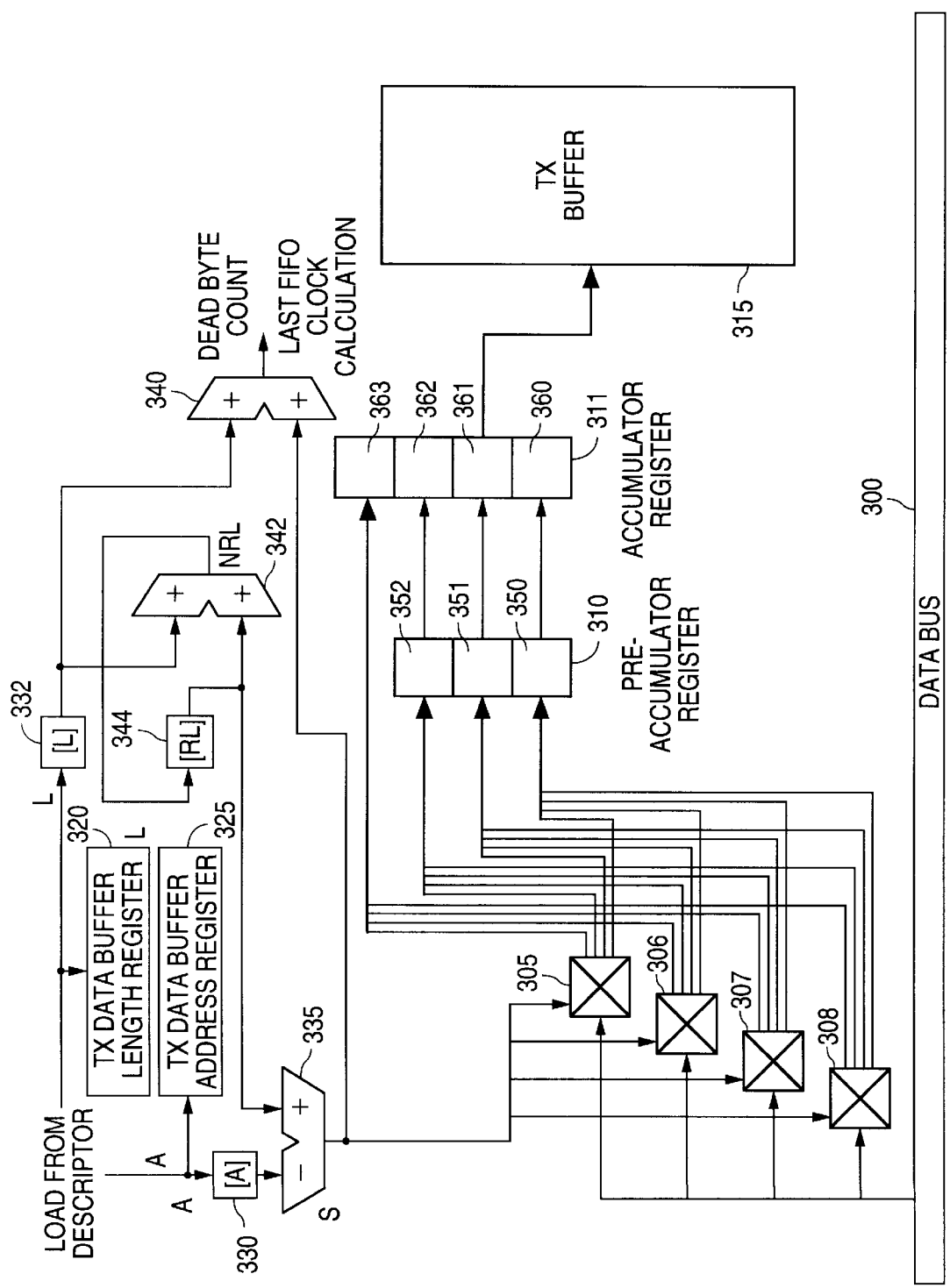
FIG. 3 is a block diagram depicting the transmit portion of a DMAC according to an example embodiment of the present invention.

FIG. 3 is a more detailed diagram of the transmit portion of the DMAC 125 of FIG. 1. As depicted in FIG. 3, the transmit channel within the DMAC 125 includes multiplexors 305, 306, 307, 308, connected between the data bus 300 and accumulator registers 310, 311. The multiplexors 305, 306, 307, 308 represent an embodiment of the transmit steer logic 205 represented in FIG. 2. The accumulator registers 310, 311 are connected to the transmit buffer 315. The number of multiplexors 305, 306, 307, 308, and accumulator registers 310, 311 required to implement the invention will depend upon the width of the memory system 110 of FIG. 1. Generally, the wider the memory system 110, the wider the data bus 300, and consequently the more multiplexors 305, 306, 307, 308 and accumulator registers 310, 311 will be desired.

FIG. 3 depicts an example embodiment of the invention that will support a four byte wide memory system 110. Thus, the embodiment depicted includes four one-byte wide multiplexors 305, 306, 307, 308 each with four one-byte wide outputs; one multiplexor for each byte of the width of the memory system 110 and one output from each multiplexor for each byte of the width of the memory system 110.

Likewise, the number of accumulator registers 310, 311 depends on the byte width of memory 110. Accumulator register 311 can store a number of bytes equal to the width of the memory 110 and the pre-accumulator register 310 only needs to hold one less byte of storage. Thus, in the pictured embodiment, the accumulator register 311 is comprised of four one-byte wide registers 360, 361, 362, 363 and the pre-accumulator register 310 is comprised of three one-byte wide registers.

The outputs of the multiplexors 305, 306, 307, 308 ire connected to the pre-accumulator register 310 and the high byte 363 of the accumulator register 311 such that if four bytes of data are present on the data bus 300, they can be written into these four byte locations of the registers 310, 311 in any order arrangement desired.

The pre-accumulator register 310 is connected to the three low order bytes 360, 361, 362 of the accumulator register 311 such that the data stored in the pre-accumulator register 310 can be transferred directly into the accumulator register 311.

The transmit steer logic 205, i.e. the multiplexors 305, 306, 307, 308, are controlled by a steer bits calculator circuit contained in the transmit logic 235 of FIG. 2. The steer bits calculator contained in the transmit logic 235 is embodied in FIG. 3 as an arithmetic logic unit (ALU) 335 fed by the [A] register 330 and the [RL] register 344. These two latched registers hold values directly from the descriptor or computed from information in the descriptor. The [A] register 330 is fed by the low order bits of the transmit data buffer address register 325 which is loaded directly from the descriptor. ALU 342 computes a value called the next running length (NRL) based upon a previous latched version of the NRL stored in the [RL] register 344 and the value held in the [L] register 332.

The [L] register 332 is fed by the low order bits of the transmit data buffer length register 320. As with the transmit data buffer address register 325, the transmit data buffer length register 320 is loaded from the descriptor. ALU 340 sums the value in the [L] register 332 with the steer bits generated by ALU 335. The resulting value, along with a number of other calculated values described below, are used to generate the clocking signals that indicate when the bytes of the data buffer are to be moved through the accumulator registers 310, 311 and transferred into the transmit buffer 315.

A specific example embodiment of the method of the present invention, in which the memory 110 of the computer system is four bytes wide, will now be described in detail. Symbols used through out the remainder of this specification in describing the method of the present invention are defined as follows:

"A" represents the least significant bits of the data buffer address. In this example embodiment these are the two least significant bits of the data buffer's address. In FIG. 3, this is the value that will be latched into [A] register 330.

[A] represents the least significant latched data buffer address bits. In this example embodiment these are the two least significant bits of the data buffer's address. These bits are captured and held when the data buffer address field is read from the descriptor. In FIG. 3, this is the value that is stored in [A] register 330.

[L] represents the least significant latched bits of the data buffer's length. In this example embodiment, these are the two least significant bits of the data buffer's length. These bits are captured and held when the data buffer length field is read from the descriptor. In FIG. 3, this is the value that is stored in [L] register 332.

[RL] represents the running length bits. In this example embodiment only two bits are required. This value is used in successive calculations of the steer bits described below. In FIG. 3, this is the value that is stored in [RL] register 344.

NRL represents the next running length bits. In this example embodiment only two bits are required. This value is used in the calculation of the [RL] running length bits, and to determine how many place holder, or "dead bytes," should be inserted at the end of a frame so as to cause the start of each successive frame transferred into the transmit buffer to be aligned on transmit buffer width boundaries. In FIG. 3, this is the value that will be latched in the [RL] register 344.

$S_{TX}$ represents the steer bits which control how the data is steered into the transmit accumulator registers. In this example embodiment, only two bits are required for the steer bits because the memory is four bytes wide. Thus, only two bits are required to specify the four possible alignments of the data into the accumulator registers. In FIG. 3, this is the value that is generated by ALU 335.

Note that some symbols are square bracketed (i.e. [A]) to indicate that they are latched. The unlatched variables are determined by the following two equations:

$$S_{TX} = [RL] - [A]$$

$$NRL = [RL] + [L]$$

The values of $S_{TX}$ and NRL are computed whenever any of the registers on the right side of the equations are reloaded. This occurs before the transfer of each data buffer begins. The logic circuitry used to accomplish these calculations is shown in FIG. 4. FIG. 4 depicts an embodiment of the steer bits calculator 235 and the clock logic 240 of FIG. 2. These are more detailed versions of the circuits depicted in FIG. 3 in that the width of the registers are specified. In other words, these two circuits as depicted in FIG. 3, represent a generalized version of the present invention that can support a memory system of any width. Meanwhile these circuits, as depicted in FIG. 4, support a memory system that is exactly four bytes wide. Also, the circuits as depicted in FIG. 4 are isolated from the rest of the transmit channel circuitry for clarity.

The steer bits calculator 235 is embodied in FIG. 4 as an arithmetic logic unit (ALU) 435 fed by the [A] register 430 and the [RL] register 444. These two latched registers hold two bit wide values directly from the descriptor or computed from information in the descriptor. The [A] register 430 is fed by the two low order bits of the transmit data buffer address register 425 which is loaded directly from the descriptor. ALU 442 computes the NRL based upon a previous latched version of the NRL stored in the [RL] register 444 and the two bit wide value held in the [L] register 432.

The [L] register 432 is fed by the two low order bits; of the transmit data buffer length register 420 which is sixteen bits wide. As with the transmit data buffer address register 425, the transmit data buffer length register 420 is loaded from the descriptor. ALU 440 sums the value in the, [L] register 432 with the steer bits generated by ALU 435. The resulting value, along with a number of other calculated values described below, are used to generate the clocking signals that indicate when the bytes of the data buffer are to be moved through the accumulator registers and transferred into the transmit buffer.

FIG. 5 depicts the four possible realignment configurations for the different steer bit values. In each case, four byte wide data is transferred from the data bus 502A, 502B, 502C, 502D through the steer logic. 504A, 504B, 504C, 504D where each byte can be directed by the steer bits to a desired byte location in the accumulator registers 506A, 506B, 506C, 506D; 508A, 508B, 508C, 508D and then the data is transferred into the transmit buffer 510A, 510B, 510C, 510D, respectively.

In the first configuration 500A, where S=$00_2$ (steer equals zero) and the data buffer was initially aligned in memory on a memory width boundary, or the previous data buffer's last transfer ended on a byte boundary previous to where the new data buffer begins. For example, if the data buffer n ends on address 401 and data buffer n+1 starts on address 202, the four bytes of data are passed straight through the accumulator registers 506A, 508A. This happens in one phase.

In the second configuration 500B, where S=$01_2$ (steer equals one) and the start of the data buffer was misaligned by one byte relative to the memory width boundary, or the previous data buffer's last transfer ended on a byte boundary previous to where the new data buffer begins, the four bytes being transferred are rotated one byte by the steering logic 504B. This happens in two phases. First, the three low order bytes from the data bus 502B are transferred into the three high order byte positions of the accumulator register 508B and the byte in the low order byte position in the pre-accumulator register 506B is simultaneously transferred into the low order byte position of the accumulator register 508B. Second, the high order byte from the data bus 502B is transferred into the low order byte position of the pre-accumulator register 506B. The accumulator register 508B now holds four bytes of the data frame that are boundary aligned and ready to be transferred into the transmit buffer 510B, while the byte in the low order byte position in the pre-accumulator register 506B is now ready for the next transfer.

In the third configuration 500C, where S=$10_2$ (steer equals two) and the start of the data buffer was misaligned by two bytes relative to the memory width boundary, or the previous data buffer's last transfer ended on a byte boundary previous to where the new data buffer begins, the four bytes being transferred are rotated two bytes by the steering logic 504C. This happens in two phases. First, the two low order bytes from the data bus 502C are transferred into the two high order byte positions of the accumulator register 508C and the two bytes in the two low order byte positions in the pre-accumulator register 506C are simultaneously transferred into the two low order byte positions of the accumulator register 508C. Second, the two high order bytes from the data bus 502C are transferred into the two low order byte positions of the pre-accumulator register 506C. The accumulator register 508C now holds four bytes of the data frame that are boundary aligned and ready to be transferred into the transmit buffer 510C, while the bytes in the two low order byte positions in the pre-accumulator register 506C are now ready for the next transfer.

In the fourth configuration 500D, where S=$11_2$ (steer equals three) and the start of the data buffer was misaligned by three bytes relative to the memory width boundary, or the previous data buffer's last transfer ended on a byte boundary previous to where the new data buffer begin, the four bytes being transferred are rotated three bytes by the steering logic 504D. This happens in two phases. First, the low order byte from the data bus 502D is transferred into the high order byte position of the accumulator register 508D and the three bytes in the pre-accumulator register 506D are simultaneously transferred into the three low order byte positions of the accumulator register 508D. Second, the three high order bytes from the data bus 502D are transferred into the pre-accumulator register 506D. The accumulator register 508D now holds four bytes of the data frame that are boundary aligned and ready to be transferred into the transmit buffer 510D, while the bytes in the pre-accumulator register 506D are now ready for the next transfer.

Together, the accumulator and the pre-accumulator are used to accumulate four consecutive, valid bytes of the data buffer for transfer into the transmit buffer. Further, the accumulator registers allow unneeded, non-data buffer bytes to be discarded without introducing delay into the process of realigning the four bytes. Instead of a slow, complex logic circuit to determine which bytes are valid or to track the valid bytes, the present invention uses the accumulator registers to dynamically accumulate the valid data. In other words, in terms of performance, the accumulator registers help align the data without any negative impact on the performance of the overall system. They merely function as a zero time delay buffering stage into the transmit buffer.

The transfers that result in the realigning of data described above are driven by a clock signal called the accumulator register clock. The generation of this clock signal is based on the following equation for an N byte wide memory system:

$$-C_n \ \& \ (((L > 0) \ \& \ (S_{TX} + A + (N - n) = (N - 1)_2)) \ |$$
$$((L > 1) \ \& \ (S_{TX} + A + (N - n) = (N - 2)_2)) \ |$$
$$((L > 2) \ \& \ (S_{TX} + A + (N - n) = (N - 3)_2)) \ |$$
$$\cdots \ |$$
$$((L > N - 1) \ \& \ (S_{TX} + A + (N - n) = 0_2)))$$

where N equals the width of the memory in bytes coded in binary;

n equals the particular byte number of the N bytes of data being transferred coded in binary;

A (as previously defined) is a binary value equivalent to the least significant bits of the address of the start of the data in memory necessary to specify the position of the start of the data relative to the N-byte wide boundaries of memory;

L is a binary value equivalent to the least significant bits of a value equal to the length of the data in bytes necessary, along with A, to specify the position of the end of the data relative to the N-byte wide boundaries of memory;

$S_{TX}$ (as previously defined) is a binary value calculated based on the position of the data in memory relative to the N-byte word boundaries that indicates one of the N possible arrangements of the N bytes of data being transferred through the configurable channel; and $C_n$ is equal to the carry bit from computing the binary addition of $A+S_{TX}+(N-n)$.

When the above expression is true, data from the data bus is clocked into the accumulator byte registers specified by the byte number n.

Figure 6:
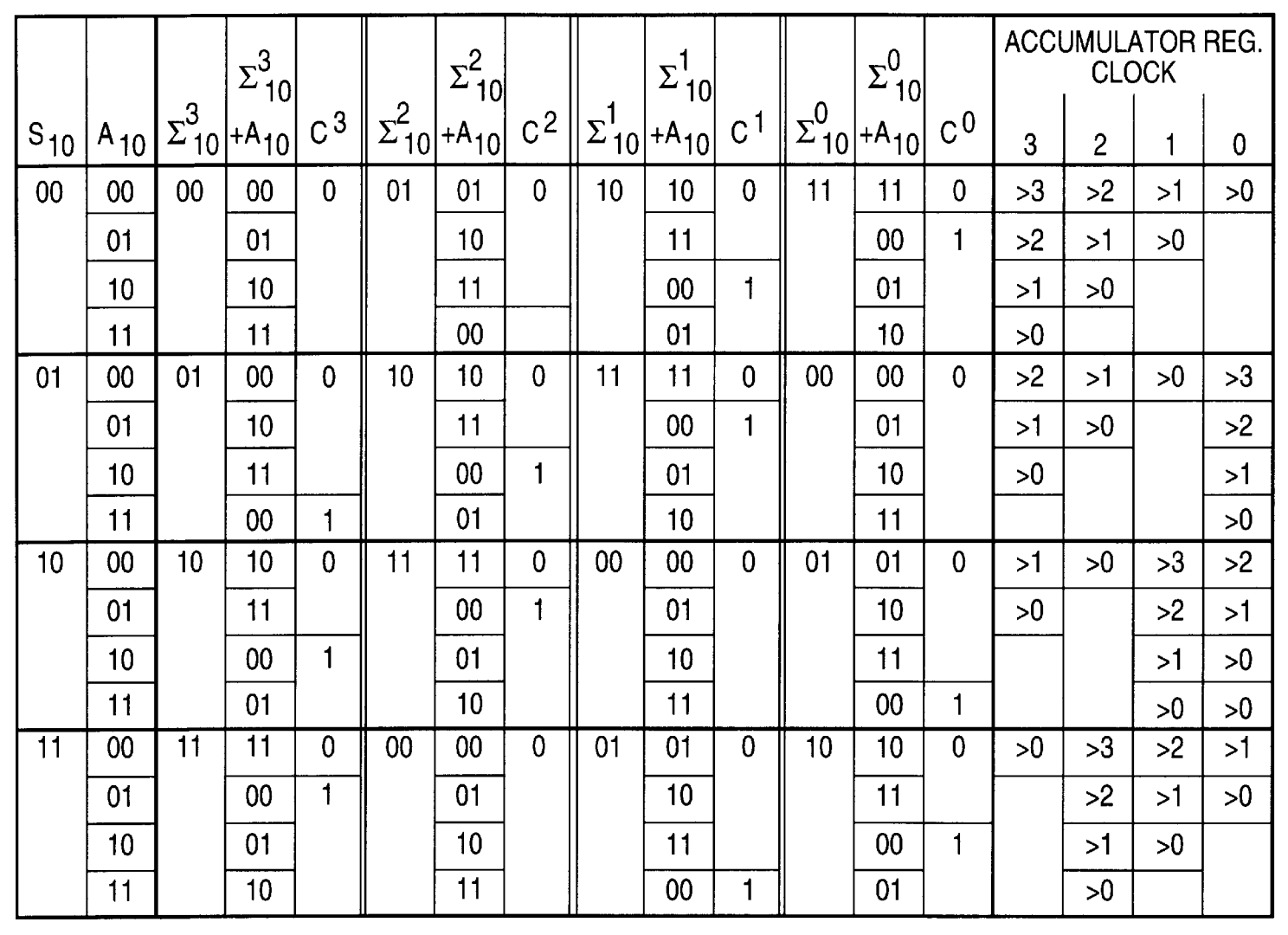

FIG. 6 depicts a truth table of the above logic expression for a four byte wide memory system. When N=4 the above expression car be simplified to:

$$-C_n \& (((L > 0) \& (S_{TX} + A + (4-n) = (3)_2)) |$$
$$((L > 1) \& (S_{TX} + A + (4-n) = (2)_2)) |$$
$$((L > 2) \& (S_{TX} + A + (4-n) = (1)_2)) |$$
$$((L > 3) \& (S_{TX} + A + (4-n) = 0_2)))$$

Note that the accumulator register is clocked into the transmit buffer each time byte three (n=3) accumulator byte register 363 in FIG. 3, is clocked according to the above expression.

Figure 7:
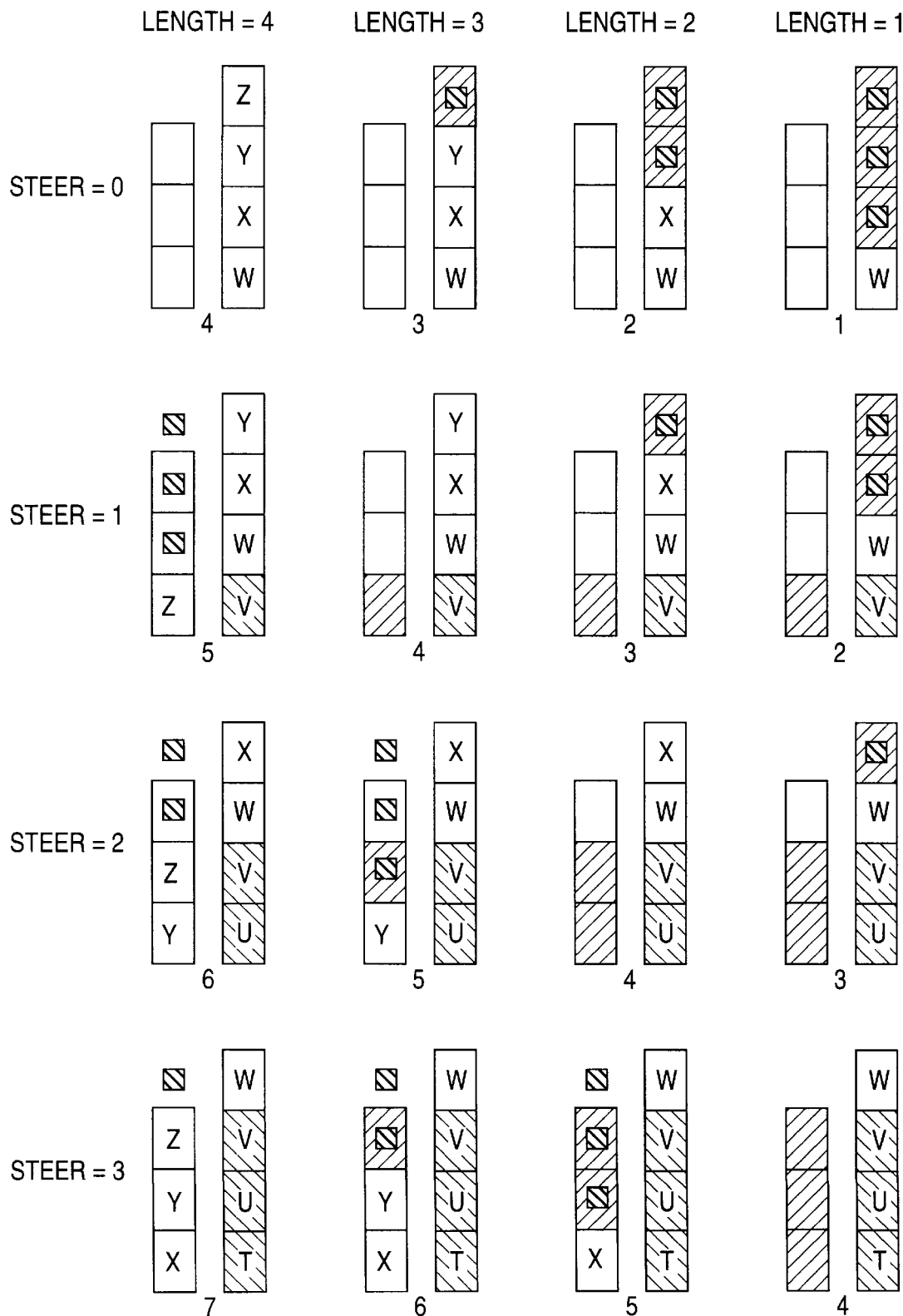
FIG. 7 is a diagram depicting "dead byte" padding requirements for different steering configurations and frame lengths according to an example embodiment of the present invention.

The present invention accounts for frames that do not end evenly on memory width boundaries by selectively appending "dead byte" padding to the end of such frames. FIG. 7 depicts all the possible states of the pre-accumulator register and the accumulator register following the last transfer of a frame. In addition, all the possible dead byte padding configurations for different steering configurations and data buffer lengths in a four byte wide memory are shown. The four length columns and four steer rows in FIG. 7 define sixteen possibilities for the amount of padding required to be appended to insure that subsequent frames start on an even memory width boundary.

Each of the sixteen possibilities are represented by the pre-accumulator register drawn next to the accumulator register. The letters contained in the byte positions of the registers represent the final valid bytes of data that will be transferred into the transmit buffer. The solid squares represent dead bytes that will also be transferred into the transmit buffer as padding. The number located at the bottom of each pre-accumulator register/accumulator register pair is equal to the sum of the steer plus the length.

Figure 8:
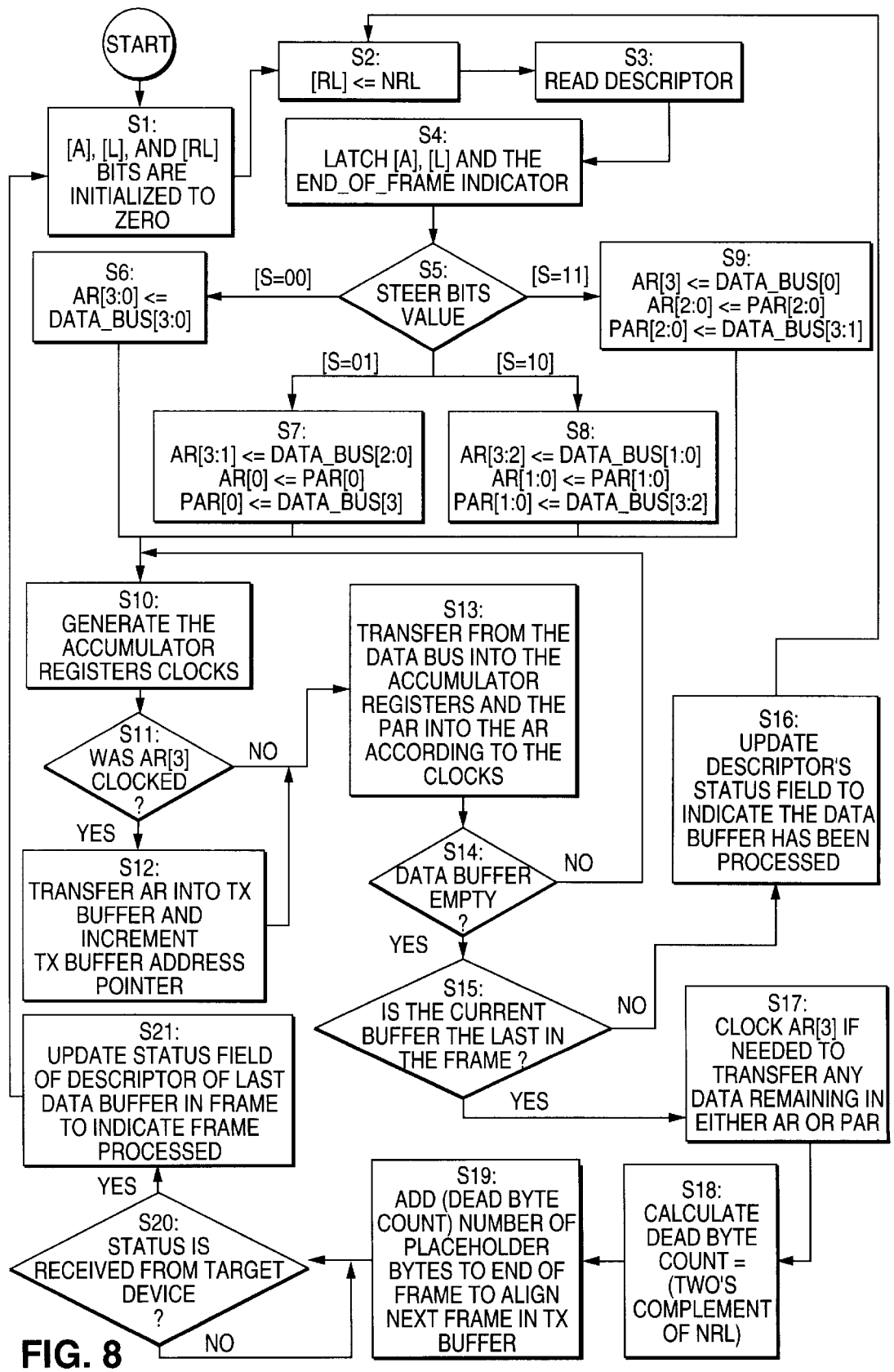
FIG. 8 is a flow chart depicting the steps required to perform an optimized transfer from memory according to an example embodiment of the present invention.

Turning now to FIG. 8, a preferred example embodiment of the process of moving a variable size frame held in one or more memory data buffers into a temporary transmit buffer is now described. Bit notation is used to refer to the bytes that make up the four bytes (double word) that get transferred with each clock cycle. For example, Byte 0 is the lowest order byte and is reference in bit notation by specifying bits seven through zero or [7:0]. As another example, [31:8] refers to the three high order bytes, Bytes 3, 2 and 1. In FIG. 8, the numbers contained in the square brackets refer to the byte numbers that are to be transferred. AR means accumulator register, PAR, means pre-accumulator register, Data_Bus means the memory location currently accessible via the data bus, and TX_buffer means transmit buffer.

In Step S1, the [A], [L], and [RL] bits are initialized to zero each time a new frame is started. In Step S2, NRL is transferred to [RL]. In Step S3, the descriptor of the current data buffer is read from memory, causing Step S4 wherein the [A] and [L] bits and the End of Frame indicator bit is latched. As a result of S4, the system flows to Step S5, wherein the steer bits become valid. This causes the system to flow to one of Step S6, S7, S8 or S9 depending on the value of the steer bits. In the selected one of these four Steps S6, S7, S8 or S9, the system configures the steering logic so that the accumulator register (AR) and the pre-accumulator register (PAR) will receive the proper bytes from the data bus.

The following transfers will occur in Step S10 in response to the specified byte being clocked according to the above described accumulator clocking expression. If $S=00_2$ in Step S5, then Data Bus[31:0] will be set to transfer into the accumulator register[31:0] in Step S6. If $S=01_2$ in Step S5, then the Data Bus[23:0] will be set to transfer into the accumulator register[31:8]; the Pre-accumulator register [7:0] will be set to transfer into the accumulator register [7:0]; and the Data Bus[31:24] will be set to transfer into the Pre-accumulator register[7:0], all in Step S7. If $S=10_2$ in Step S5, then the Data Bus[15:0] will be set to transfer into the accumulator register[31:16]; the Pre-accumulator register[15:0] will be set to transfer into the accumulator register[15:0]; and the Data Bus[31:16] will be set to transfer into the Pre-accumulator register[15:0], all in Step S8. Finally, If $S=11_2$ in Step S5, then the Data Bus[7:0] will be set to transfer into the accumulator register[31:24]; the Pre-accumulator register[23:0] will be set to transfer into the accumulator register[23:0]; and the Data Bus[31:8] will be set to transfer into the Pre-accumulator register[23:0], all in Step S9.

In Step S10, the accumulator register clocks are derived from the table of FIG. 6 based on the accumulator register clock logic expression above. After each transfer caused by the clock signal generated in S10, the system checks if the high byte of the accumulator register was clocked in S11. If it was, then the accumulator register is immediately transferred to the transmit buffer in Step S12. If not, the transfers continue in Step S13.

The transmit buffer write clock is activated after etch time the high byte of the accumulator register clock activates. Each transmit buffer write clock causes the transmit buffer to advance to its next address. Each transmit buffer address is formatted with 32 data bits and three transmit buffer control bits. Bits 31:0 are Frame data bits, Bits 33:32 DB indicate the number of dead bytes that are at the end of a frame, and Bit 34 EoFC (End of Frame Control) indicates the last transmit buffer entry in the frame. This bit is set in a null entry that may be used for frame status. The null entry is used to delineate frame boundaries. An example of the use of the control bits is described below with reference to FIG. 11.

After each transfer, the system checks to see if the data buffer has been completely transferred in Step S14. If not, the system flows back to Step S10 and continues clocking the data through. If the data buffer has been depleted the system moves to Step S15 where it is determined whether the current data buffer is the last in the frame. If the current data buffer is not the last in the frame, the Descriptor's Status field is updated to indicate that the data buffer has been processed and the system flows back to Step S2 to begin on the next data buffer in the frame.

If the current data buffer is the last in the frame, then the high byte in the accumulator register maybe clocked if needed to transfer any data remaining in the accumulator registers in Step S17. An extra transmit buffer write clock may be needed due to different combinations of the steer bits and the number of bytes remaining in the data buffer during the last transfer (this value is found in the data buffer Length register). FIG. 7 shows the accumulator registers as they appear after the last data transfer of a frame. As explained in Step S12, a transmit buffer write clock is activated immediately following an accumulator register clock for the high byte position. However, for cases shown in FIG. 7, where the sum of steer plus Length is greater than four, there is no accumulator register clock for the high byte position. Therefore, an extra transmit buffer write clock is required to close out the frame. An extra transmit buffer write clock is required when the sum of steer plus Length is greater than four because this means that there is valid frame data in the Pre-accumulator register on the last transfer.

Dead bytes are inserted at the end of a frame to realign, the next frame on a double-word boundary in the transmit buffer. The solid square in FIG. 7 is used to represent the insertion of a dead byte. In Step S18, the number of dead bytes to be inserted is calculated by taking the two's complement of the value of the NRL bits, i.e. the number of unused bytes for a given transmit buffer address. In Step S19, the required number of dead bytes are appended to the end of the frame.

In Step S20, the system waits for a status signal from the target device. Once status is received from the destination interface, the descriptor's Status field is updated in Step 21 to indicate that the frame has been processed, and the system returns to Step S1 to process the next frame if any remain.

FIG. 11 depicts a portion of the transmit buffer 215 of FIG. 2 that has been loaded according to the process described above. The shaded blocks 1102, 1104 represent frame data. Note that dead bytes 1106 are used to end the frame evenly on a memory width boundary so that the next frame 1104 starts on a memory width boundary. The control bits 1110 correspond to the control bits 215A of FIG. 2. The control bits 1110 indicate what is contained in each double word of the transmit buffer 215. In this particular example embodiment of the control bits 1110, $000_2$ is used to indicate frame data, $1XX_2$ (where X represents "don't care") is used to indicate the End of Frame Control Word 1108, and $0YY_2$ (where YY represents a binary number from 1 to 3) is used to indicate the number of dead bytes 1106 that have been appended to the end of the frame 1102. Inserting an end of frame control word enables the DMAC to stack multiple frames in the transmit buffer without keeping track of their characteristics.

Turning back to FIG. 1, the details of a receive channel according to the present invention will now be described. Similar to the transmit channel, upon receiving a receive DMA request signal 120 from the source device 150, the DMAC 125 will request control of the buses 130, 132, 134 from the processor 115 via a bus request signal 127. The processor 115 will relinquish control of the buses 130, 132, 134 and signal the DMAC 125 indicating as such via the bus acknowledge signal 129. Then, the DMAC 125 will set up a receive channel from the source device 150, into the receive buffer 135, through the DMAC 125, out over the data bus 130, and into memory 110.

The lower half of FIG. 2 depicts a block diagram of a receive channel within a DMAC 125 of FIG. 1. The receive channel with the, DMAC 125 is comprised of receive steer logic 255 connected to the receive buffer 250 and the receive accumulation registers 260 connected between the receive steer logic 255 and the data bus 200. The receive buffer 250 is typically implemented using a first-in, first-out random access memory. The receive steer logic 255 and the receive accumulation registers 260 are used to quickly and efficiently align the data on memory width boundaries as it passes through the receive channel.

Also connected to the data bus 200 are the receive data buffer address register 275 and the receive data buffer length register 280. These registers 275, 280 store the memory address and length from the descriptors of the data buffer currently being transferred and feed them into the logic 285, 270, 265, 245 that calculates the information needed by the receive steer logic 255 to align the data buffer and also generate the clocking signals that trigger the transfer of bytes from the source device 150 of FIG. 1 into the receive buffer 250 and then out of the receive buffer 250 onto the data bus 200 and into memory 110 of FIG. 1. In particular, the least significant hits 275A and 280A of the receive data buffer address register 275 and the receive data buffer length register 280 respectively are stored in register 285 where they are accessible by the receive logic 270 which is driven by the bus control state machine 245. The receive logic 270 feeds control signals to the receive steer logic 255 as described above and it also controls the receive buffer 250 by sending signals to the receive buffer clock logic 265 and the receive buffer control bits 250A.

Figure 12:
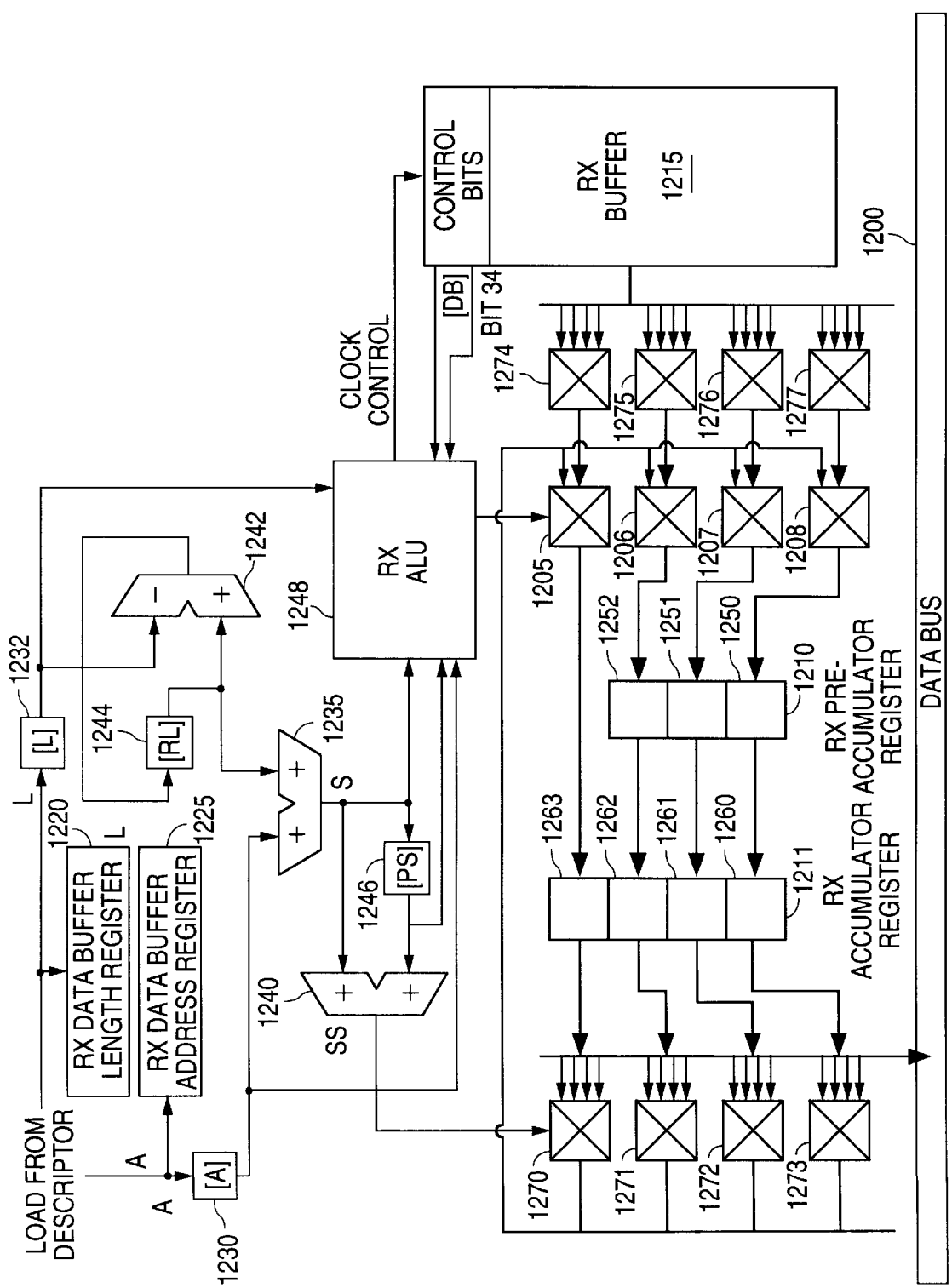
FIG. 12 is a block diagram depicting the receive portion of a DMAC according to an example embodiment of the present invention.

FIG. 12 is a more detailed diagram of the receive portion of the DMAC 125 of FIG. 1. As depicted in FIG. 12, the receive channel within the DMAC 125 includes multiplexors 1274, 1275, 1276, 1277, 1205, 1206, 1207, 1208, connected between the receive buffer 1215 and the accumulator registers 1210, 1211. In addition, there are a second set of multiplexors 1270, 1271, 1272, 1273 that provide a connection between the outputs of the accumulator registers 1210, 1211 and the inputs of the multiplexors 1205, 1206, 1207, 1208. All together the multiplexors 1205, 1206, 1207, 1208, 1270, 1271, 1272, 1273, 1274, 1275, 1276, 1277, represent an embodiment of the receive steer logic 255 represented in FIG. 2. The receive accumulator registers 1210, 1211 are connected to the data bus 1200. The number of multiplexors 1205, 1206, 1207, 1208, 1270, 1271, 1272, 1273, 1274, 1275, 1276, 1277, and accumulator registers 1210, 1211 required to implement the invention will depend upon the width of the memory system 110 of FIG. 1. As with the transmit portion of the DMAC 125, the wider the memory system 110, the wider the data bus 1200, and consequently the more multiplexors 1205, 1206, 1207, 1208, 1270, 1271, 1272, 1273, 1274, 1275, 1276, 1277, and accumulator registers 1210, 1211 will be desired.

The outputs of the multiplexors 1205, 1206, 1207, 1208 are connected to the pre-accumulator register 1210 and the high byte 1263 of the accumulator register 1211 such that if four bytes of data are presented by the receive buffer 1215, they can be written into these four byte locations of the registers 1210, 1211 in any order arrangement desired.

The pre-accumulator register 1210 is connected to the three low order bytes 1260, 1261, 1262 of the accumulator register 1211 such that the data stored in the pre-accumulator register 1210 can be transferred directly into the accumulator register 1211.

The receive steer logic 255, i.e. the multiplexors 1205, 1206, 1207, 1208, 1270, 1271, 1272, 1273, 1274, 1275, 1276, 1277, are controlled by steer and shuffle steer bits calculators contained within the received logic 270 of FIG. 2. The steer bits calculator contained within the receive logic 270 is embodied in FIG. 12 as an ALU 1235 fed by the [A] register 1230 and the [RL] register 1244. These two latched registers hold values directly from the descriptor or computed from information in the descriptor. The [A] register 1230 is fed by the low order bits of the receive data buffer address register 1225 which is loaded directly from the descriptor. ALU 1242 computes a value called the next running length (NRL) based upon a previous latched version of the NRL stored in the [RL] register 1244 and the value held in the [L] register 1232.

The [L] register 1232 is fed by the low order bits of the receive data buffer length register 1220. As with the receive data buffer address register 1225, the receive data buffer length register 1220 is loaded from the descriptor. ALU 1240 combines the value in the [PS] register 1246 with the steer bits generated by ALU 1235. The resulting value is called the shuffle steer. The shuffle steer bits control the multiplexors 1270, 1271, 1272, 1273 to determine which bytes are selected to be fed back to and stored back into the receive accumulator register 1211. The [PS] register 1246 is fed from ALU 1235 which generates the steer bits as mentioned above. The [PS] register 1246 holds the previous value of the steer bits. The receive logic 1248 takes [L], [S], [PS], [A], [DB] and Bit 34 as inputs and generates the clock control signal that is fed to the receive buffer 1215 and the steer logic control signal that controls the multiplexors 1205, 1206, 1207, 1208. The [DB] value and Bit 34 value from the control bits are generated by a transmit DMAC as described above with regard to the transmit portion of the present invention.

Figures 13, 14:
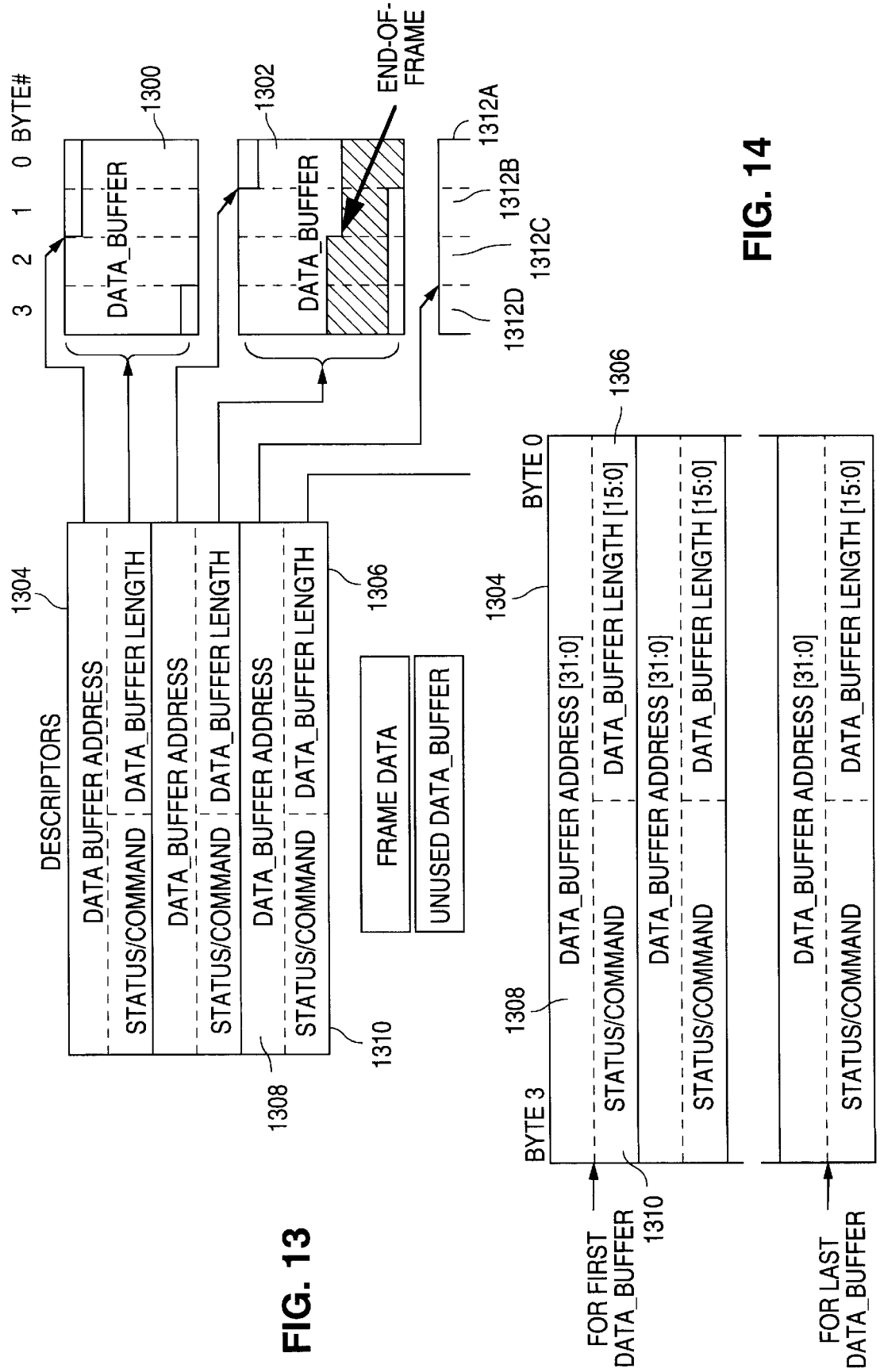
FIG. 13 is a diagram depicting receive descriptors and associated data buffers according to an example embodiment of the present invention.
FIG. 14 is a diagram depicting the detail of receive descriptors describing a frame according to an example embodiment of the present invention.

Turning to FIGS. 13 and 14, data buffers 1300, 1302 are defined by descriptors 1304 which, as with descriptors used by the transmit portion described above, are small tables in memory that define the size 1306, location 1308 and status 1310 of the data buffers 1300, 1302. The receive channel of the present invention properly aligns the received data in the data buffers 1300, 1302. A single frame may be composed of several data buffers 1300, 1302. The data buffers 1300, 1302 may be of any number of bytes in length, and start on any address boundary 1312A, 1312B, 1312C, 1312D, i.e. in a four byte wide system where the data is not aligned on double-word boundaries 1312A. As described above, receive accumulator registers and steering logic are located between the bus interface and the receive buffer to realign the bytes.

Each descriptor 1304 contains information about its corresponding data buffers 1300. The descriptors 1304 hold the address pointer 1308 and length 1306 of the data buffer 1300 along with a status/command field 1310. This information is read from memory into the corresponding address and length registers on the DMAC as each data buffer 1300 is processed. Note that there may be more than one data buffer 1300 per frame. The number of data buffers 1300 per frame is determined by an End of Frame indicator bit written to the status/command field 1310 of each descriptor entry after the data buffer 1300 has been processed. The amount of memory used is also written to the data buffer Length field 1306 at this time. To receive a frame, the driver of the peripheral device, i.e. the source device 150 in FIG. 1, is first required to set up a sufficient number of data buffers 1300 in memory 110. Next, the descriptors 1304 are set up with all the necessary information describing the data buffers 1300. Once these tasks are completed, the frame is ready to begin being received according to the present invention.

The following symbols will be used throughout th, remainder of this specification. $S_{RX}$ represents the steer bits for aligning the bytes in the receive accumulator register along a memory width boundary. [PS] represents latched steer bits used in successive calculations of the shuffle steer bits. SS represents shuffle steer bits used to determine how frame data is shuffled in the receive accumulator register for alignment when starting a new data buffer. These values are computed based on the equations:

$$S_{RX}=[RL]+[A]$$

$$SS=[PS]-S=[PS]-([RL]+[A])$$

These equations change whenever any of the values on the right side of the equations are reloaded. This occurs before the data buffer processing begins.

Figure 15:
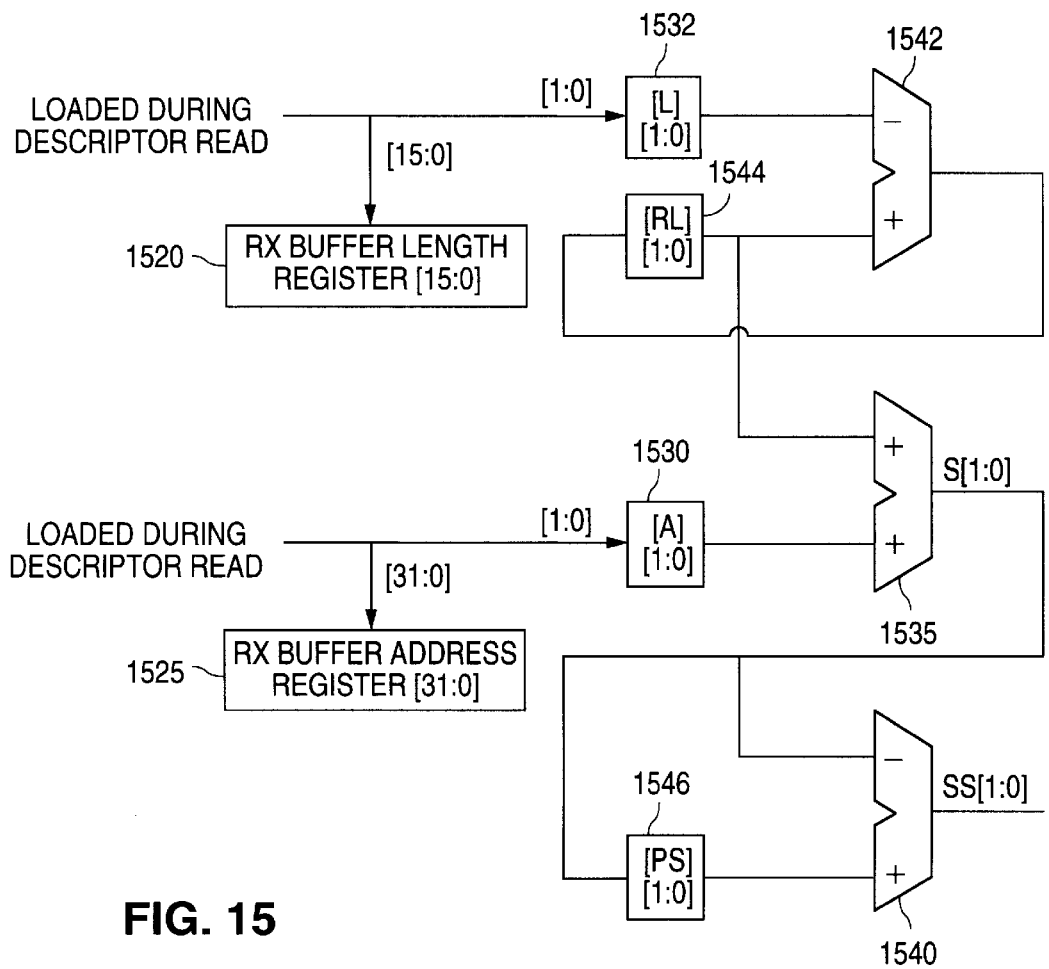
FIG. 15 is a block diagram depicting a circuit for configuring the receive channel according to an example embodiment of the present invention.

FIG. 15 illustrates a specific example embodiment of the steer and shuffle steer calculators of the present invention for a memory system that is four bytes wide. The steer bits calculator contained within the receive logic 270 is embodied in FIG. 15 as an ALU 1535 connected to compute the sum of the two bit wide [A] register 1530 and the two bit wide [RL,] register 1544. These two latched registers hold values directly from the descriptor or computed from information in the descriptor. The [A] register 1530 is fed by the two low order bits of the four byte wide receive data buffer address register 1525 which is loaded directly from the descriptor. ALU 1542 computes the next RL value based upon the difference between a previous latched version of the RL stored in the [RL] register 1544 and the value held in the two bit wide [L] register 1532. The [L] register 1532 is fed by the two low order bits of the two byte wide receive data buffer length register 1520. As with the four byte wide receive data buffer address register 1525, the receive data buffer length register 1520 is loaded from the descriptor.

The shuffle steer calculator is embodied as ALU 1540 connected to compute the difference between the value in the two bit wide [PS] register 1546 and the steer bits generated by ALU 1535. The [PS] register 1546 is fed from ALU 1535 which generates the steer bits as mentioned above. The [PS] register 1546 holds the previous value of the steer bits.

FIG. 16 depicts the four possible realignment configurations for the different receive steer bit values. In each case, four byte wide data is transferred from the receive buffer 1602A, 1602B, 1602C, 1602D through the receive steer logic 1604A, 1604B, 1604C, 1604D where each byte can be directed by the steer bits to a desired byte location in the receive accumulator registers 1606A, 1606B, 1606C, 1606D; 1608A, 1608B, 1608C, 1608D. This is done in preparation to transfer the data onto the data bus 1610A, 1610B, 1610C, 1610D, respectively.

In the first configuration 1600A, where $S=00_2$ (steer equals zero) and the data buffer was initially aligned in memory on a memory width boundary, or the previous data buffer's last transfer ended on a byte boundary previous to where the new data buffer begins. For example, data buffer n ends on address 401 and data buffer n+1 starts on address 202, the four bytes of data are passed straight through the accumulator registers 1606A, 1608A. This happens in one phase.

In the second configuration 1600B, where $S=01_2$ (steer equals one) and the start of the data buffer was misaligned by one byte relative to the memory width boundary, or the previous data buffer's last transfer ended on a byte boundary previous to where the new data buffer begins, the four bytes being transferred are rotated one byte by the steering logic 1604B. This happens in two phases. First, the three low order bytes from the receive buffer 1602B are transferred into the three high order byte positions of the accumulator register 1608B and the byte in the low order byte position in the pre-accumulator register 1606B is simultaneously transferred into the low order byte position of the accumulator register 1608B. Second, the high order byte from the receive buffer 1602B is transferred into the low order byte position of the pre-accumulator register 1606B. The accumulator register 1608B now holds four bytes of the data frame that are boundary aligned and ready to be aligned with the data buffer and then transferred onto the data bus 1610B, while the byte in the low order byte position in the pre-accumulator register 1606B is now ready for the next transfer.

In the third configuration 1600C, where S=$10_2$ (steer equals two) and the start of the data buffer was misaligned by two bytes relative to the memory width boundary, or the previous data buffer's last transfer ended on a byte boundary previous to where the new data buffer begins, the four bytes being transferred are rotated two bytes by the steering logic 1604C. This happens in two phases. First, the two low order bytes from the receive buffer 1602C are transferred into the two high order byte positions of the accumulator register 1608C and the two bytes in the two low order byte positions; in the pre-accumulator register 1606C are simultaneously transferred into the two low order byte positions of the accumulator register 1608C. Second, the two high order bytes from the receive buffer 1602C are transferred into the two low order byte positions of the pre-accumulator register 1606C. The accumulator register 1608C now holds four bytes of the data frame that are boundary aligned and ready to be aligned with the data buffer and then transferred onto the data bus 1610C, while the bytes in the two low order byte positions in the pre-accumulator register 1606C are now ready for the next transfer.

In the fourth configuration 1600D, where S=$11_2$ (steer equals three) and the start of the data buffer was misaligned by three bytes relative to the memory width boundary, or the previous data buffer's last transfer ended on a byte boundary previous to where the new data buffer begins, the four bytes being transferred are rotated three bytes by the steering logic 1604D. This happens in two phases. First, the low order byte from the receive buffer 1602D is transferred into the high order byte position of the accumulator register 1608D and the three bytes in the pre-accumulator register 1606D are simultaneously transferred into the three low order byte positions of the accumulator register 1608D. Second, the three high order bytes from the receive buffer 1602D are transferred into the pre-accumulator register 1606D. The accumulator register 1608D now holds four bytes of the data frame that are boundary aligned and ready to be aligned with the data buffer and then transferred onto the data bus 1610D, while the bytes in the pre-accumulator register 1606D are now ready for the next transfer.

Together, the receive accumulator and the receive pre-accumulator are used to accumulate four consecutive, valid bytes of the receive buffer for alignment with the data buffer and then transferred onto the data bus. Further, the receive accumulator registers allow unneeded, non-data buffer bytes to be discarded without introducing delay into the process of realigning the four bytes. Instead of a slow, complex logic circuit to determine which bytes are valid or to track the valid bytes, the present invention uses the receive accumulator registers to dynamically accumulate the valid data. In other words, in terms of performance, the receive accumulator registers help align the data without any negative impact on the performance of the overall system. They merely function as a zero time delay buffering stage into the transmit buffer.

Figures 17A, 17B:
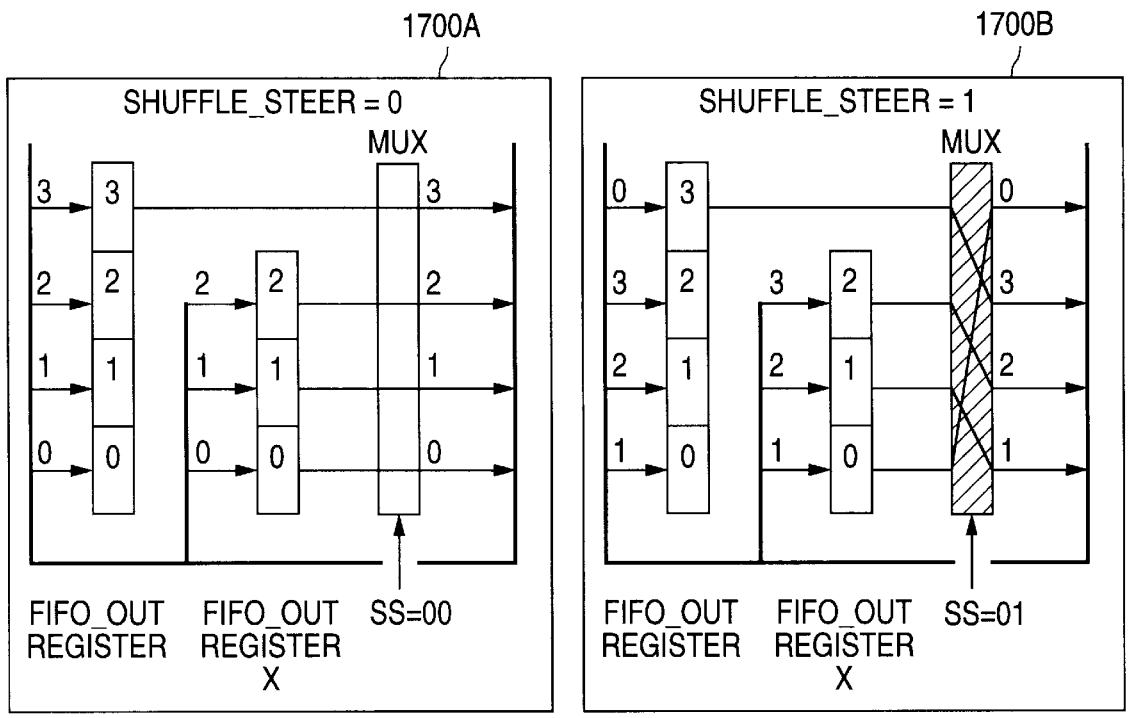
FIG. 17 is a diagram depicting the possible receive channel shuffle steering configurations for an example four byte wide system according to an example embodiment of the present invention.
Figures 17C, 17D:
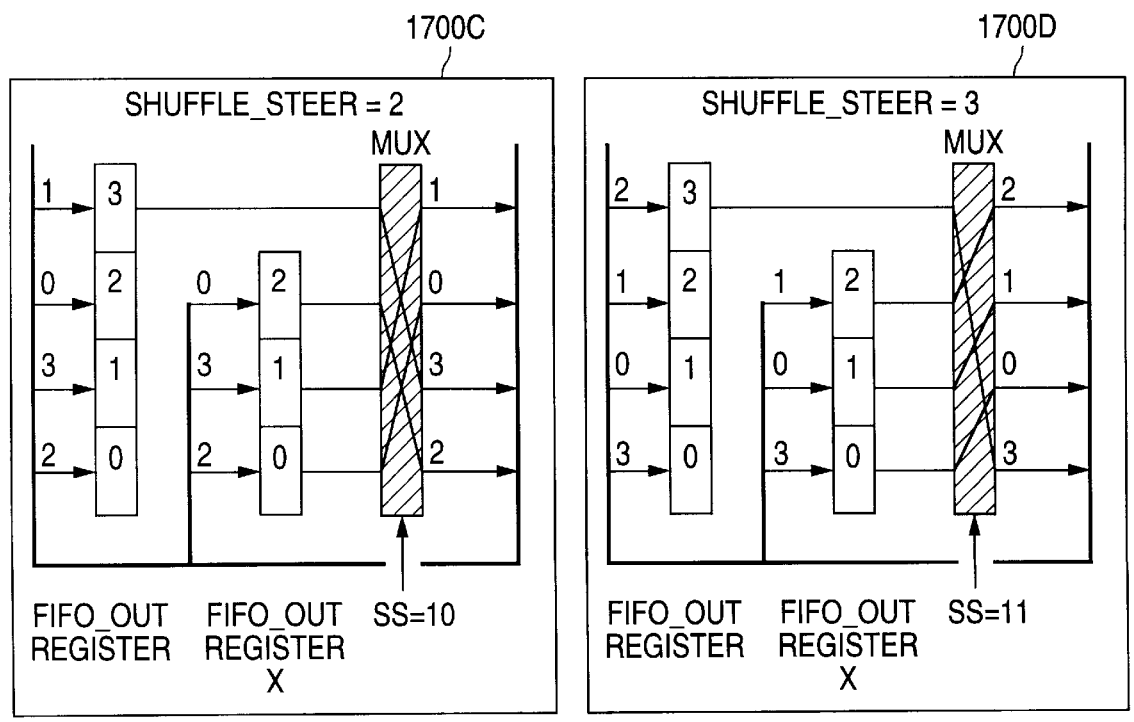

Turning to FIG. 17, before the contents of the receive accumulator register can be transferred to the data bus to be stored in memory, the data in the receive accumulator must be realigned with the data bus each time a new data buffer is needed as the frame is stored into memory. Recall that data buffers do not necessarily start evenly on memory width boundaries. Each time a data buffer fills up a new one is started. The shuffle steer logic is used to realign the data in the receive accumulator register so that it will be properly transferred into memory so as to start at the beginning of the data buffer. FIG. 17 illustrates the four possible cases with a four byte wide memory. In the first case 1700A, where the shuffle steer value equals zero, no shuffling takes place because the data buffer is aligned with the memory width boundaries as is the data in the receive accumulator register. In the second case 1700B, where the shuffle steer value equals one, the bytes in the receive accumulator register are rotated by one byte. In the third case 1700C, where the shuffle steer value equals two, the bytes in the receive accumulator register are rotated by two bytes. In the fourth case 1700D, where the shuffle steer value equals three, the bytes in the receive accumulator register are rotated by three bytes.

Figure 18:
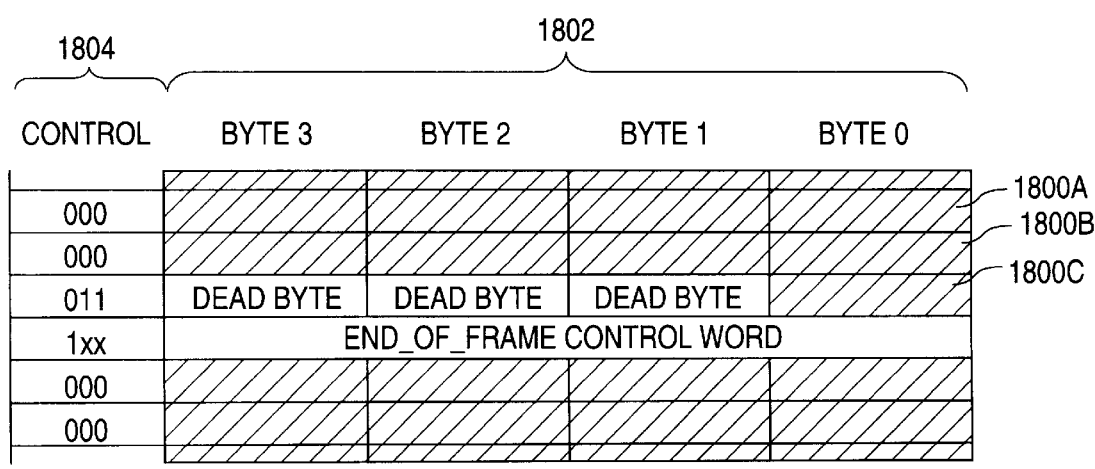
FIG. 18 is a diagram depicting a receive buffer format example according to an example embodiment of the present invention.

Turning to FIG. 18, in a system with a four byte wide memory, each receive buffer address 1800A, 1800B, 1800C is formatted with thirty-two data bits 1802 and three receive buffer control bits 1804. These three receive buffer control bits include two bits labeled DB which indicate the number of dead bytes required at the end of a frame to make the frame end on a memory width boundary and one bit labeled EoFC that indicates the last receive buffer entry in the frame. This bit is set in a null entry that may be used for frame status. The null entry is used to delineate frame boundaries. Inserting an end of frame control word enables the DMAC to stack multiple frames in the receive buffer without keeping track of their characteristics.

There are four clocks needed to load the contents of the receive buffer into the receive accumulator register and the receive pre-accumulator register. These include: a receive accumulator register initial clock (ARCI); a receive accumulator register running clock (ARCR); a receive accumulatorregister end of frame clock (ARCE); and a receive accumulator register look ahead clock (ARCL). The activation of any of these clocks causes the receive buffer to advance to its next address. The logic for generating each of these clocks is described in detail below.

Once the steer and shuffle steer logic is configured, the receive accumulator register needs to have initial data loaded into it. This is done with the ARCI which occurs (1) at the beginning of every frame and (2) in the case where all the data residing in the receive accumulator register was written out to the previous data buffer in memory, as expressed in the following equation:

$$(S>[A])|((S=[A]) \& ([PS]=0))$$

Figures 19, 20, 21:
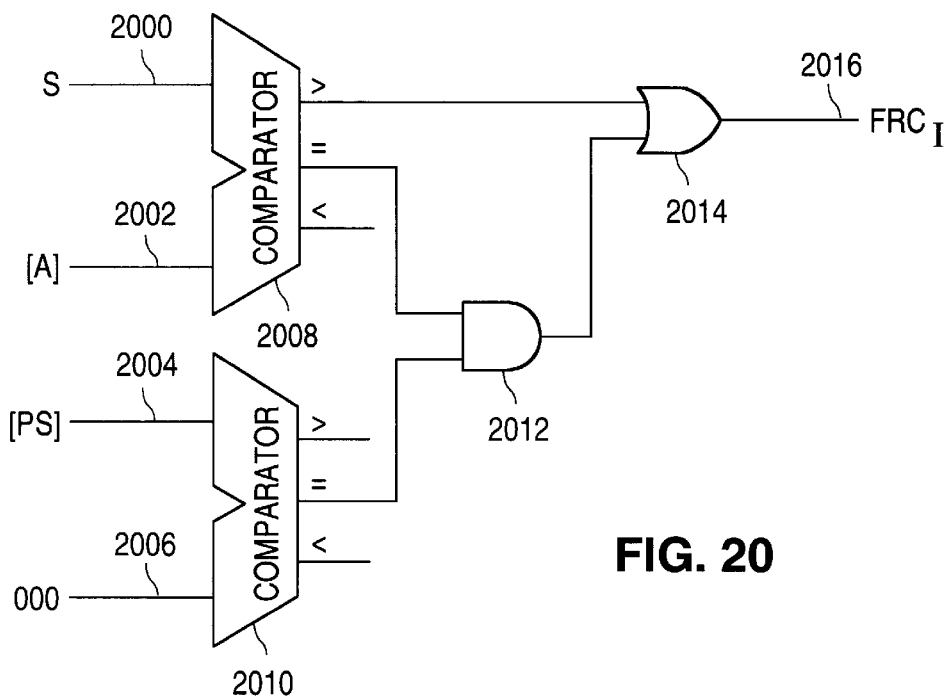
FIG. 19 is a truth table defining when the receive accumulator register initial clock is enabled according to an example embodiment of the present invention.
FIG. 20 is a block diagram depicting an example circuit implementing the truth table of FIG. 19 according to an example embodiment of the present invention.
FIG. 21 is a truth table defining when the receive accumulator register clock is inhibited according to an example embodiment of the present invention.

Turning to FIG. 19, this second case is derived from the a truth table indicating when ARCI should assert because all the data residing in the receive accumulator register was written out to the previous data buffer in memory. Once the ARCI clocks, the state machine is ready to initiate transfers to memory.

Turning to FIG. 20, an example logic circuit implementing the truth table of FIG. 19 is depicted. S 2000 and [A] 2002 are compared by comparator 2008. If S 2000 is greater than [A] 2002 a signal is asserted to the OR gate 2014. If they are equal, a signal is asserted to the AND gate 2012. [PS] 2004 is compared to zero 2006 by comparator 2010. If [PS] 2004 is equal to zero 2006, then a signal is asserted to the AND gate 2012. The output of AND gate 2012 is fed to the second input of OR gate 2014. The result generated by the OR gate 2014 is the ARCI 2016.

The ARCR is activated with each bus cycle except the last bus cycle of a data buffer and in the case where the second to last transfer of a data buffer occurs and the data in the receive accumulator register will not be transferred to the data buffer in memory during the last data buffer transfer. This is expressed in the following equation:

$$(S>([A]+[L])) \& (([A]+[L]!=0)$$

Figure 22:
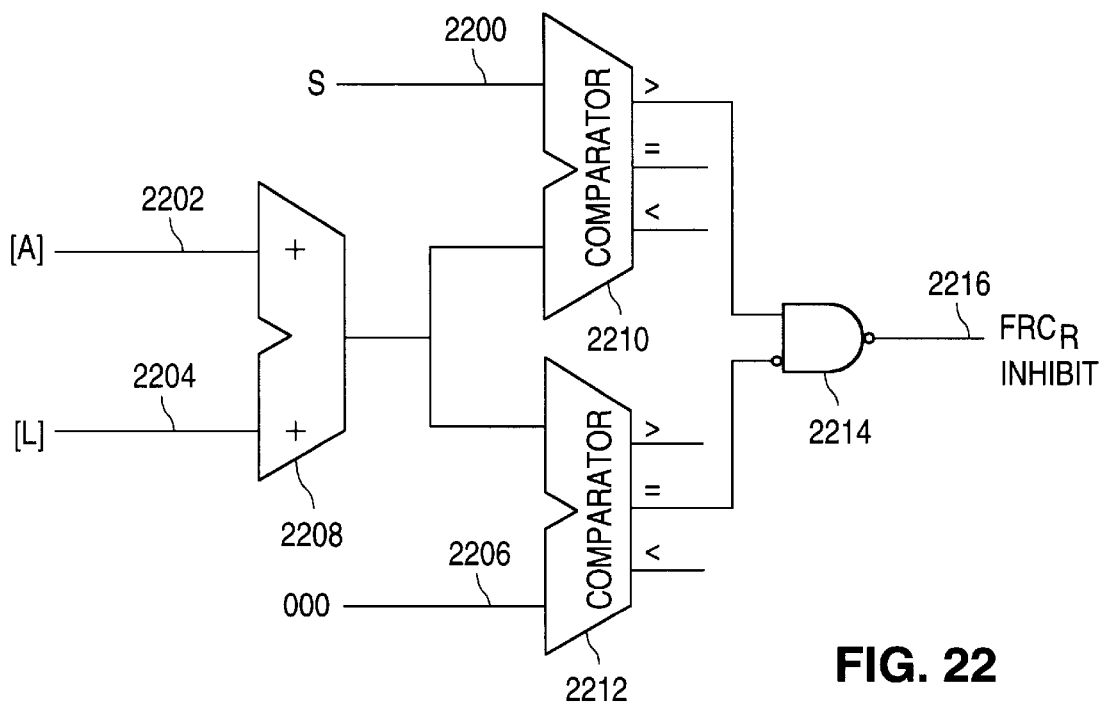
FIG. 22 is a block diagram depicting an example circuit implementing the truth table of FIG. 21 according to an example embodiment of the present invention.

This equation is derived from the truth table depicted in FIG. 21 and an example of a logic circuit implementing this equation is depicted in FIG. 22. [A] 2202 and [L] 2204 are summed by ALU 2208. The result is compared with S 2200 and with zero 2206. If S 2200 is greater than the result, a signal is asserted to the NAND gate 2214. If the result is equal to zero, an inserted signal is asserted to the NAND gate 2214. The result of the NAND) gate 2214 is ARCR inhibit 2216.

The possibility of a frame ending at any time always exists. If this occurs during either of the inhibits indicated above, and there are dead bytes in the receive accumulator register and all the frame data has already been written out to the data buffer, the inhibits are preferably overridden. This is desirable because if it were not done, a data buffer would be wasted. In other words, dead bytes would be placed in a new data buffer and the data buffer's descriptor would indicate zero length and consequently be closed.

This exception is handled by the ARCE. It is activated with each bus cycle if the following equation is satisfied:

$$([DB]>0) \& (([DB]+[L]-S)>4)$$

Figure 23:
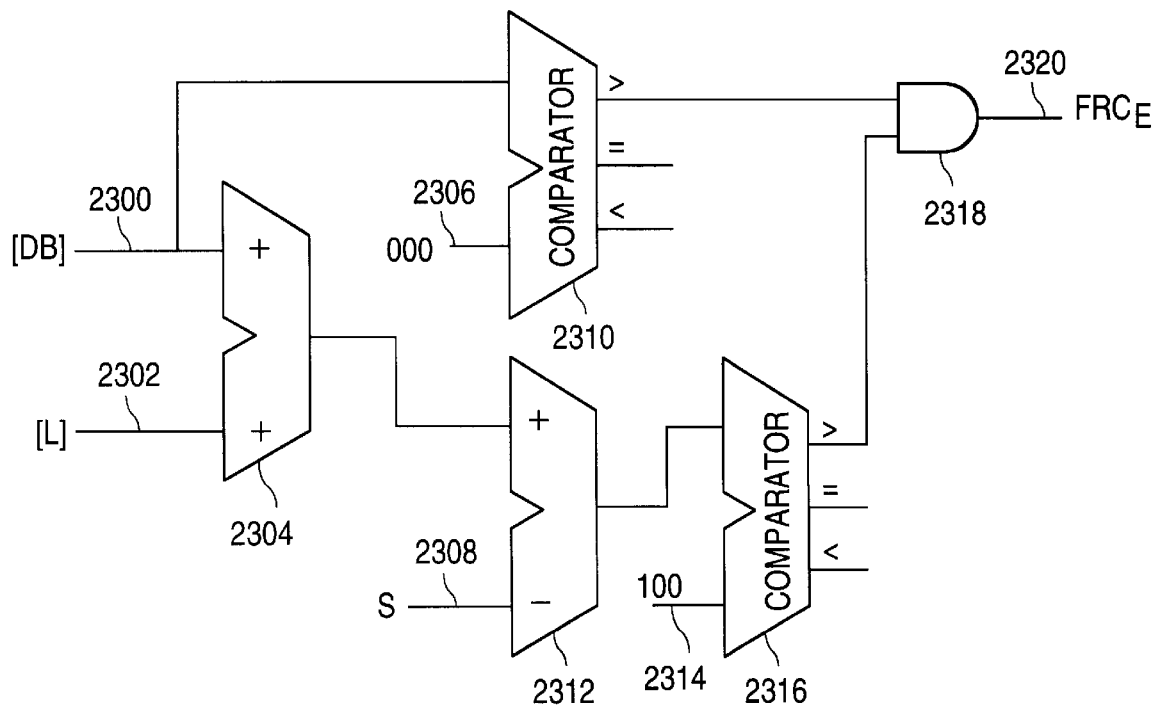
FIG. 23 is a block diagram depicting an example clocking circuit for exceptions according to an example embodiment of the present invention.

This equation is expressed in the example logic circuit of FIG. 23. [DB] 2300 and [L] 2302 are summed by ALU 2304. The result is feed to ALU 2312 where S 2308 is subtracted out and the result is passed to comparator 2316. Comparator 2316 compares the result with $100_2$ 2314 and if it is greater than $100_2$, a signal is asserted to the AND gate 2318. Meanwhile, [DB] 2300 is compared to zero 2306 in comparator 2310, and if it is greater than zero 2306, a signal is asserted to the second input of AND gate 2318. The result of the AND gate 2318 is ARCE 2320.

Once the end of a data buffer has been reached, the ARCL is used to determine if the total frame has fit within the confines of the current data buffer. If so, the EoFC word placed in the receive buffer must be clocked and the receive accumulator register must be aligned with the beginning of a new frame. This is desirable because if it were not done, a data buffer would be wasted because dead bytes would be placed in a new data buffer arid the data buffer's descriptor would indicate zero length and consequently be closed.

The ARCL is activated during the last data buffer transfer if the following criteria apply:

$$(\text{EoFC in receive Buffer}) \& (S=0) \& (([A]+[L])=0)$$

Figure 24:
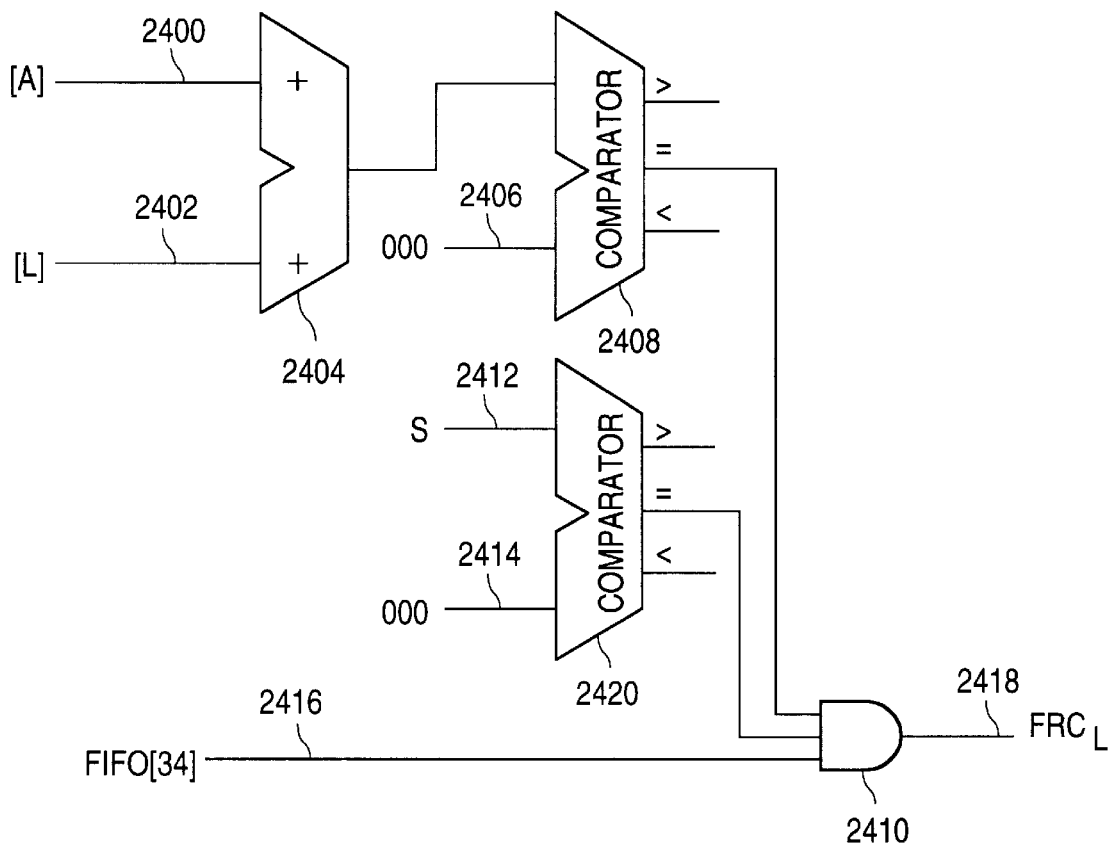
FIG. 24 is a block diagram depicting a second example clocking circuit for exceptions according to an example embodiment of the present invention.

This is the case where the steer bits are zero and there are a multiple of four bytes in the frame, but the End of Frame control word his not yet been clocked out of the receive buffer. FIG. 24 depicts an example logic circuit implementing this expression. [A] 2400 and [L] 2402 are summed in ALU 2404, the result is compared to zero 2406 in comparator 2409. If it is equal to zero, a signal is asserted to AND gate 2410. If S 2412 is equal to zero 2414 as a result of comparator 2420, then a signal is asserted to a second input of AND gate 2410. Finally, Bit 34 2416 of the control bits is applied directly to a third input of AND gate 2410. The result of AND gate 2410 is ARCL 2418.

Figure 25A:
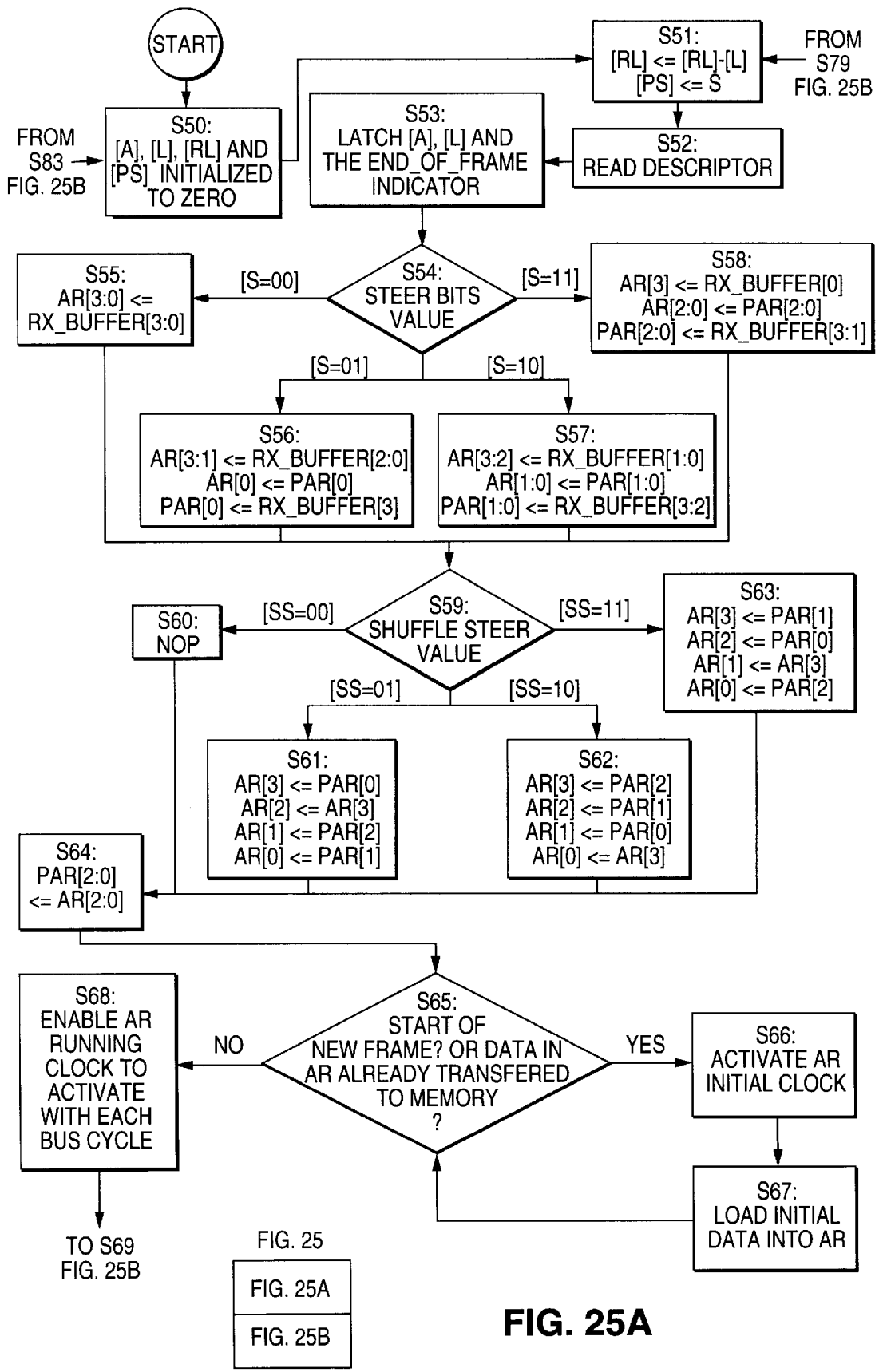
FIG. 25 is a flow chart depicting the steps required to perform an optimized transfer to memory according to an example embodiment of the present invention.
Figure 25B:
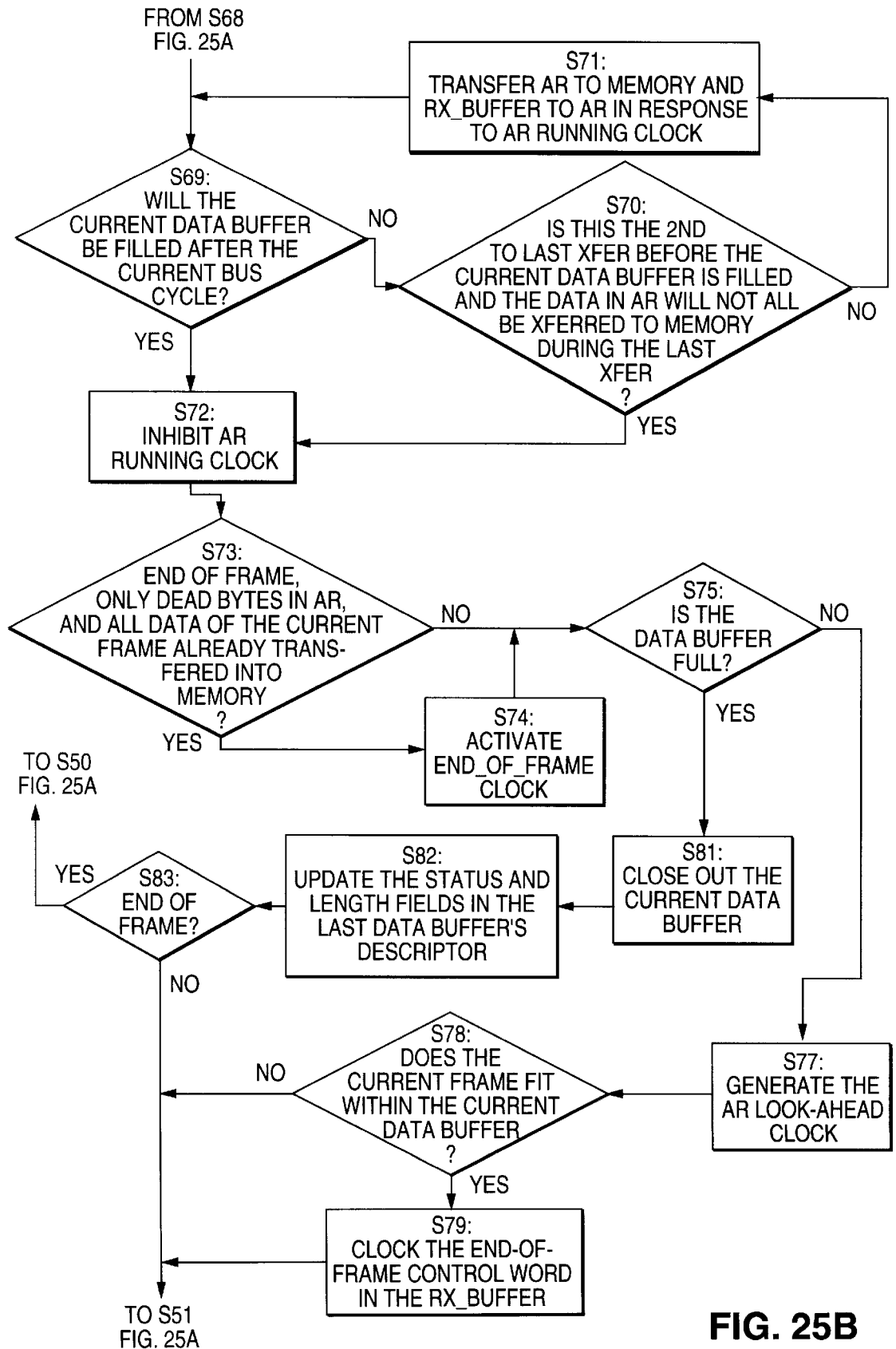

Turning to FIG. 25, a preferred example embodiment of the process of moving a variable size frame temporarily held in a receive buffer into predefined data buffers in memory is now described. As with the description of the process for moving data from memory, bit notation is used to refer to the bytes that make up the four bytes (double word) that get transferred with each clock cycle. For example, Byte 0 is the lowest order byte and is reference in bit notation by specifying bits seven through zero or [7:0]. As another example, [31:8] refers to the three high order bytes, Bytes 3, 2 and 1. In FIG. 25, the numbers contained in the square brackets refer to the byte numbers that are to be transferred. AR means accumulator register, PAR means pre-accumulator register, and RX_buffer means receive buffer.

In Step S50, the [A], [L], [RL], and [PS] bits are initialized to zero each time a new frame is started. In Step S51, [RL] - [L] is transferred into [RL] and S is transferred into [PS]. In Step S3, the Descriptor for the next available data buffer in memory is read. This causes the [A] and [L] bits and the End of Frame indicator to be latched in Step S53. After Step S53, the steer bits are now valid in Step S54, causing the receive accumulator registers to be aligned with the proper bytes from the receive buffer based on the current value of S.

If $S=00_2$, then the state machine flows to Step S55 where the channel is configured to make four bytes at a time transfer straight from the current receive buffer location into the accumulator register.

If $S=01_2$, then the state machine flows to Step S56 where the channel is configured to transfer the receive buffer[23:0] into the receive accumulator register[31:8], the receive pre-accumulator register[7:0] into the receive accumulator register[7:0], and the receive buffer[31:24] into the receive pre-accumulator register[7:0].

If $S=10_2$, then the state machine flows to Step S57 where the channel is configured to transfer the receive buffer[15:0] into the receive accumulator register[31:16], the receive pre-accumulator register[15:0] into the receive accumulator register[15:0], and the receive buffer[31:24] into the receive pre-accumulator register[15:0].

If $S=11_2$, then the state machine flows to Step S58 where the channel is configured to transfer the receive buffer[7:0] into the receive accumulator register[31:24], the receive pre-accumulator register[23:0] into the receive accumulator register[23:0], and the receive buffer[31:8] into the receive pre-accumulator register[23:0].

Next the receive accumulator register is realigned with the data bus each time a new data buffer is needed because the previous data buffer is filled as the frame is being stored into memory. This one step process is not necessary the first time through. However, the system is simplified by not trying to skip this step. The shuffle steer bits [SS] computed and evaluated in Step S59, control which bytes are selected to be fed back lo and stored back into the receive accumulator register.

If $SS=00_2$, then the state machine flows to Step S60 where the channel is configured not to rearrange the bytes in the accumulator registers.

If $SS=01_2$, then the state machine flows to Step S61 where the channel is configured to transfer the contents of the receive pre-accumulator register[7:0] into the receive accumulator register[31:24], the receive accumulator register [31:24] into the receive accumulator register[23:16], the receive pre-accumulator register[23:16] into the receive accumulator register[15:8], and the receive pre-accumulator register[15:8] into the receive accumulator register[7:0].

If SS=10$_2$, then the state machine flows to Step S62 where the channel is configured to transfer the contents of the receive pre-accumulator register[23:16] into the receive accumulator register[31:24], the receive pre-accumulator register[15:8] into the receive accumulator register[23:16], the receive pre-accumulator register[7:0] into the receive accumulator register[15:8], and the receive accumulator register[31:24] into the receive accumulator register[7:0].

If SS=11$_2$, then the state machine flows to Step S63 where the channel is configured to transfer the contents of the receive pre-accumulator register[15:8] into the receive accumulator register[31:24], the receive pre-accumulator register [7:0] into the receive accumulator register[23:16], the receive accumulator register[31:24] into the receive accumulator register[15:8], and the receive pre-accumulator register[23:16] into the receive accumulator register[7:0].

In every case, the next step is Step S64 in which the contents of the receive accumulator register[23:0] are transferred into the receive pre-accumulator register[23:0]. At this point, the receive accumulator register needs to have initial data loaded. This is done with the receive accumulator register initial clock (ARCI) which occurs at the beginning of every frame, or in the case where all the data residing in the receive accumulator register was written out to the previous data buffer in memory. In Step S65, the state machine checks whether the data is at the start of a new frame or if the data in the accumulator register has already been transferred into memory. If either case is true, the ARCI is activated in Step S66 and as a result the initial data is loaded into the accumulator register in Step S67. At this point, the state machine is ready to initiate transfers to memory. Control then returns to Step S65. It should be noted that each clock causes the receive buffer to advance to its next address and each receive buffer address is formatted to include 32 data bits and three receive buffer control bits are discussed above.

The receive accumulator register running clock (ARCR) is activated with each bus cycle except the last transfer of a data buffer and in the case where the second to last transfer of a data buffer occurs and the data in the receive accumulator register will not be transferred to the data buffer in memory during the last data buffer transfer. If the machine is not at the start of a new frame and the data in the accumulator register has not been transferred to memory in Step S65, then the system enables the ARCR which causes a transfer by activating with each bus cycle.

After each activation of ARCR, the system checks to see if the current data buffer will be filled after the current bus cycle in Step S69. If not, the system checks to see if this is the second to last transfer before the current data buffer is filled and the data in the accumulator register will not all be transferred to memory during the last transfer in Step S70. If not, the system transfers the accumulator register contents to memory and the contents of the current receive buffer location to the accumulator register in response to the ARCR. In this case, the system returns to step S69. If this is the second to last transfer before the current data buffer is filled and the data in the accumulator register will not all be transferred to memory during the last transfer, then the system flows to Step S72 where the ARCR is inhibited. Likewise, if the current data buffer will be filled after the current bus cycle, then the system flows to Step S72 where the ARCR is inhibited.

The possibility of a frame ending at any time always exists. If this occurs during either of the inhibits expressed in the previous steps, there are dead bytes in the receive accumulator register, and all the frame data has already been written out to the data buffer, the inhibits are preferably over-ridden. This is desirable because if it were not done, a data buffer would be wasted. In other words, dead bytes would be placed in a new data buffer and the, data buffer's descriptor would indicate zero length, and as a consequence the data buffer would be closed.

This gives rise to the need for a receive accumulator register end of frame clock (ARCE). The system checks to see if the end of the frame has been reached, there are only dead bytes in the accumulator register, and all of the data of the current frame has been transferred into memory in Step S73. If so, the ARCE is activated in Step S74 and the system flows to Step S75. If not, the system flows directly to Step S75.

Once the end of a data buffer has been reached, the receive accumulator register look-ahead clock (ARCL) is used to determine if the total frame has fit within the confines of the current data buffer. If so, the end of frame word placed in the receive buffer must be clocked and the receive accumulator register must be aligned with the beginning of a new frame. This is desirable because if it were not done, a data buffer would be wasted; dead bytes would be placed in a new data buffer, the descriptor would indicate zero length and consequently be closed. Therefore the ARCL is activated during the last data buffer transfer if the steer bits are zero and there are a multiple of four bytes; in the frame but the end of frame control word has not yet been clocked out of the receive buffer.

Thus, in Step S75, the system checks to see if the data buffer is full. If not, the ARCL is generated in Step S77, and then system proceeds to check to see if the current frame fits within the current data buffer in Step S78. If it does fit, then the end of frame control word is clocked in the receive buffer and control returns to Step S51 to Start a new data buffer. Otherwise, the system goes directly to Step S51 to start a new data buffer.

If back in Step S75 the data buffer is found not to be filly, the system proceeds to Step S81 where the current data buffer is closed out and the status and length fields in the last data buffer's descriptor are updated in Step S82. The status field indicates whether or not the end of the frame had been reached within the confines of the current data buffer in memory. The system then checks to see if the end of the current frame has been reached in Step S83. If not, control returns to Step S51 to start filling a new data buffer. If so, control returns to Step S50 to start a new frame.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of optimizing a data transfer from an N-byte wide memory system within a data processing system using a bus master controller and an M-byte wide transmit buffer, wherein the data is organized in data frames, each data frame is comprised of data buffers, and each data buffer having an associated descriptor block including a memory system address pointer field for holding an address pointer, a length field for holding a length value, a status field for holding a status value, and a command field for holding a command value, the method comprising the steps of:

initializing first and second latched storage registers capable of holding the least significant bits of the address pointer and the length value, which together indicate the alignment of the start and end of the data buffer relative to N-byte wide boundaries within the memory system, to zero;

initializing a third latched storage register capable of holding an intermediate value used to calculate the byte arrangement for transferring an individual data buffer into the transmit buffer;

loading the descriptor block values including the address pointer to the next data buffer to be transferred, the length value of the next data buffer to be transferred, the status value of the next data buffer to be transferred, and the command value of the next data buffer to be transferred, into the bus master controller from the memory system;

loading and latching the first, second, and third latched storage registers in response to loading the descriptor block values;

calculating a steer value based upon the values stored in the latched storage registers;

steering N bytes of the data buffer into Accumulator registers;

calculating a clocking value based on the transfer of the N bytes of data into the Accumulator registers to determine when the Accumulator registers contain the proper arrangement of the current N bytes of the data buffer;

writing the current N bytes of the data buffer into the transmit buffer from the Accumulator registers;

transferring any remaining bytes of the data buffer by repeating the steps of steering, calculating a clocking value, and writing until all bytes of the data buffer have been transferred into the transmit buffer;

repeating the steps of initializing the third latched storage register, loading descriptor block values, loading and latching the first, second, and third latched storage registers, calculating a steer value, steering, calculating a clocking value, writing, and transferring until all data buffers of the current data frame have been transferred into the transmit buffer;

writing one or more place holder bytes into the transmit buffer after the end of the transferred data frame to insure that the next data frame to be written will start on a M-byte wide boundary in the transmit buffer; and writing a value into the status field of the descriptor block of the last data buffer of the transferred data frame to indicate that the frame has been transferred.

2. A direct memory access data transfer apparatus, comprising:

a configurable channel from a memory to a transmit buffer; and channel configuration means, coupled to said configurable channel, for configuring said configurable channel to transfer data into said transmit buffer aligned on even transmit buffer width boundaries, wherein said configurable channel includes:

steering logic coupled to said memory; and
    accumulator registers coupled to said steering logic and said transmit buffer, and wherein the steering logic comprises N multiplexors each having a single one byte-wide input coupled to the memory, N one byte-wide outputs coupled to the accumulator registers, and $ln(N)/ln(2)$ control steering inputs coupled to the channel configuration means, wherein N equals the width of the memory in bytes.

3. The apparatus of claim 2, wherein the accumulator registers comprise:

a first set of N-1 one byte wide shift registers coupled to the steering logic; and a second set of N one byte wide shift registers, wherein:
    N-1 shift registers of said second set are directly coupled to the first set of shift registers and coupled to the transmit buffer; and
    the remaining one shift register of the second set of shift registers is coupled to the steering logic and the transmit buffer.

4. The apparatus of claim 2, wherein the channel configuration means comprises:

data descriptor registers; and means for computing an arrangement of the data that will result in the data being written into the transmit buffer aligned on transmit buffer width boundaries, wherein said means for computing is coupled to the data descriptor registers and the configurable channel.

5. The apparatus of claim 4 wherein the data descriptor registers comprise:

a data address register coupled to the means for computing; and a data length register coupled to the means for computing.

6. The apparatus of claim 4 wherein the means for computing comprises:

a steer bits calculator coupled to the configurable channel and the data descriptor registers; and a clocking calculator coupled to the configurable channel, the data descriptor registers, and the steer bits calculator.

7. The apparatus of claim 6 wherein the clock calculator comprises combinatorial logic for generating a clock signal that indicates an appropriate time to transfer N bytes of the data through the configurable channel into the transmit buffer based on a truth of a Boolean expression:

$$-C_n\ \&\ (((L > 0)\ \&\ (S_{TX} + A + (N - n) = (N - 1)_2))\ |$$
$$((L > 1)\ \&\ (S_{TX} + A + (N - n) = (N - 2)_2))\ |$$
$$((L > 2)\ \&\ (S_{TX} + A + (N - n) = (N - 3)_2))\ |$$
$$\ldots\ |$$
$$((L > N - 1)\ \&\ (S_{TX} + A + (N - n) = 0_2)))$$

wherein N equals a width of the memory coded in binary;

n equals a particular byte number of the N bytes of data being transferred coded in binary;

A is a binary value equivalent to least significant bits of an address of a start of the data in the memory necessary to specify a position of the start of the data relative to N-byte wide boundaries of the memory;

L is a binary value equivalent to least significant bits of a value equal to a length of the data in bytes necessary, along with A, to specify a position of an end of the data relative to the N-byte wide boundaries of the memory;

S is a binary value calculated based on a position of the data in the memory relative to the N-byte wide boundaries that indicates one of N possible arrangements of the N bytes of data being transferred through the configurable channel; and $C_n$ equals a carry bit from computing a binary addition of A+S+(N−n).

8. A direct memory access data transfer apparatus, comprising:

a configurable channel from a receive buffer to a memory; and channel configuration means, coupled to said configurable channel, for configuring said configurable channel to transfer data into said memory aligned on even memory width boundaries, wherein said configurable channel includes:
steering logic coupled to said memory; and
accumulator registers coupled to said steering logic and said receive buffer, and wherein the steering logic comprises N multiplexors each having a single one byte-wide input coupled to th receive buffer, N one byte-wide outputs coupled to the accumulator registers, and In(N)/In(2) control steering inputs coupled to the channel configuration means, wherein N equals the width of the memory in bytes, wherein the accumulator registers comprise:
a first set of N-1 one byte wide shift registers coupled to the steering logic; and
a second set of N one byte wide shift registers, wherein:
N-1 shift registers of said second set are directly coupled to the first set of shift registers and coupled to the memory; and
the remaining one shift register of the second set of shift registers is coupled to the steering logic and the memory.

9. The apparatus of claim 8, wherein the channel configuration means comprises:

data descriptor registers; and means for computing an arrangement of the data that will result in the data being written into the memory aligned on memory width boundaries, wherein said means for computing is coupled to the data descriptor registers and the configurable channel.

10. The apparatus of claim 9, wherein the data descriptor registers comprise:

a data address register coupled to the means for computing; and a data length register coupled to the means for computing.

11. The apparatus of claim 9, wherein the means for computing comprises:

a steer bits calculator coupled to the configurable channel and the data descriptor registers; and a clocking calculator coupled to the configurable channel, the data descriptor registers, and the steer bits calculator.

* * * * *